United States Patent
Chang

(10) Patent No.: US 9,463,846 B2
(45) Date of Patent: Oct. 11, 2016

(54) BICYCLE REAR DERAILLEUR WITH A DAMPER ASSEMBLY

(71) Applicant: SRAM Deutschland GmbH, Schweinfurt (DE)

(72) Inventor: Jih-Hung Chang, Taichung (TW)

(73) Assignee: SRAM Deutschland GmbH, Schweinfurt (DE)

( * ) Notice: Subject to any disclaimer, the term of this patent is extended or adjusted under 35 U.S.C. 154(b) by 0 days.

(21) Appl. No.: 14/581,733

(22) Filed: Dec. 23, 2014

(65) Prior Publication Data

US 2016/0176478 A1    Jun. 23, 2016

(30) Foreign Application Priority Data

Dec. 23, 2013  (DE) .................. 10 2013 227 071
Dec. 5, 2014   (DE) .................. 10 2014 225 036

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *B62M 9/1248* | (2010.01) |
| *B62M 9/126* | (2010.01) |
| *B62M 9/16* | (2006.01) |

(52) U.S. Cl.
CPC ........... *B62M 9/1248* (2013.01); *B62M 9/126* (2013.01); *B62M 9/16* (2013.01)

(58) Field of Classification Search
CPC .. B62M 9/1248; B62M 9/126; B62M 9/122; B62M 9/1244; B62M 9/1348
USPC ....................................................... 474/80, 82
See application file for complete search history.

(56) References Cited

U.S. PATENT DOCUMENTS 4,406,643 A * 9/1983 Shimano ................ B62M 9/126
                                                            474/80
6,135,904 A * 10/2000 Guthrie ................. B62M 9/126
                                                            474/82

(Continued)

FOREIGN PATENT DOCUMENTS

DE    102007040156 A1    2/2009
DE    102011114699 A1    4/2012

(Continued)

*Primary Examiner* — Henry Liu
(74) *Attorney, Agent, or Firm* — Milan Milosevic; Lisa Serdynski

(57) ABSTRACT

A bicycle rear derailleur includes a base member mountable to a bicycle frame. A movable member is movably coupled to the base member. A chain guide assembly is rotatably connected to the movable member for rotation about a rotational axis. A biasing device is configured to bias the chain guide assembly in a first rotational direction relative to the movable member. A damper assembly is disposed between the chain guide assembly and the movable member to apply a damping force to the chain guide assembly when the chain guide assembly rotates in a second rotational direction opposite to the first rotational direction. The damper assembly includes a one-way roller clutch assembly including radially inner and outer clutch members and roller elements acting between the inner and outer clutch members and a friction device including a friction biasing device and friction surfaces axially biased against and in frictional engagement with the one-way roller clutch assembly by the friction biasing device. The friction surfaces are axially offset with reference to the rotational axis relative to the roller elements.

20 Claims, 17 Drawing Sheets

(56) References Cited

U.S. PATENT DOCUMENTS

| | | | | |
|---|---|---|---|---|
| 8,202,182 | B2* | 6/2012 | Ishikawa | B62M 9/1248 192/226 |
| 8,900,078 | B2* | 12/2014 | Yamaguchi | B62M 9/1244 474/80 |
| 2007/0219029 | A1* | 9/2007 | Turner | B62M 9/16 474/80 |
| 2008/0026890 | A1* | 1/2008 | Oseto | B62M 9/1242 474/82 |
| 2008/0026891 | A1* | 1/2008 | Oseto | B62M 9/1242 474/82 |
| 2009/0054183 | A1* | 2/2009 | Takachi | B62M 9/16 474/80 |
| 2009/0291789 | A1* | 11/2009 | Ishikawa | B62M 9/1248 474/82 |
| 2012/0083371 | A1* | 4/2012 | Yamaguchi | B62M 9/126 474/80 |
| 2012/0083372 | A1* | 4/2012 | Yamaguchi | B62M 9/126 474/80 |
| 2012/0142466 | A1* | 6/2012 | Lin | B62M 9/124 474/80 |
| 2012/0258827 | A1* | 10/2012 | Ishikawa | B62M 9/1248 474/80 |
| 2013/0090195 | A1 | 4/2013 | Yamaguchi | |
| 2013/0090196 | A1* | 4/2013 | Yamaguchi | B62M 9/1244 474/80 |
| 2013/0203532 | A1* | 8/2013 | Jordan | B62M 9/1248 474/82 |
| 2013/0288834 | A1* | 10/2013 | Yamaguchi | B62M 9/126 474/80 |
| 2013/0310204 | A1* | 11/2013 | Shahana | B62M 9/121 474/80 |
| 2014/0162817 | A1* | 6/2014 | Yamaguchi | B62M 9/122 474/80 |
| 2014/0296009 | A1* | 10/2014 | Suyama | B62M 9/122 474/80 |
| 2014/0371013 | A1* | 12/2014 | Yamaguchi | B62M 9/126 474/122 |

FOREIGN PATENT DOCUMENTS

| | | |
|---|---|---|
| DE | 202007019470 U1 | 1/2013 |
| DE | 102013001952 A1 | 8/2013 |

* cited by examiner

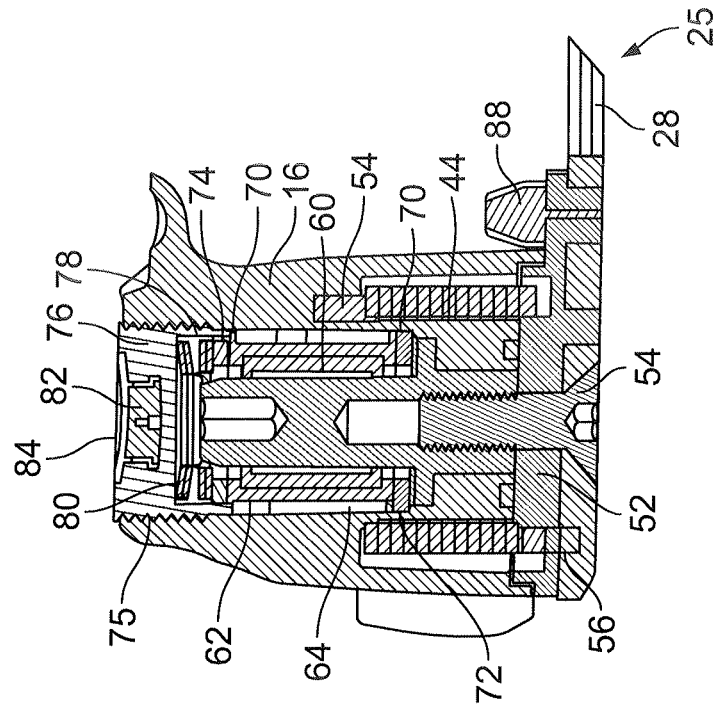
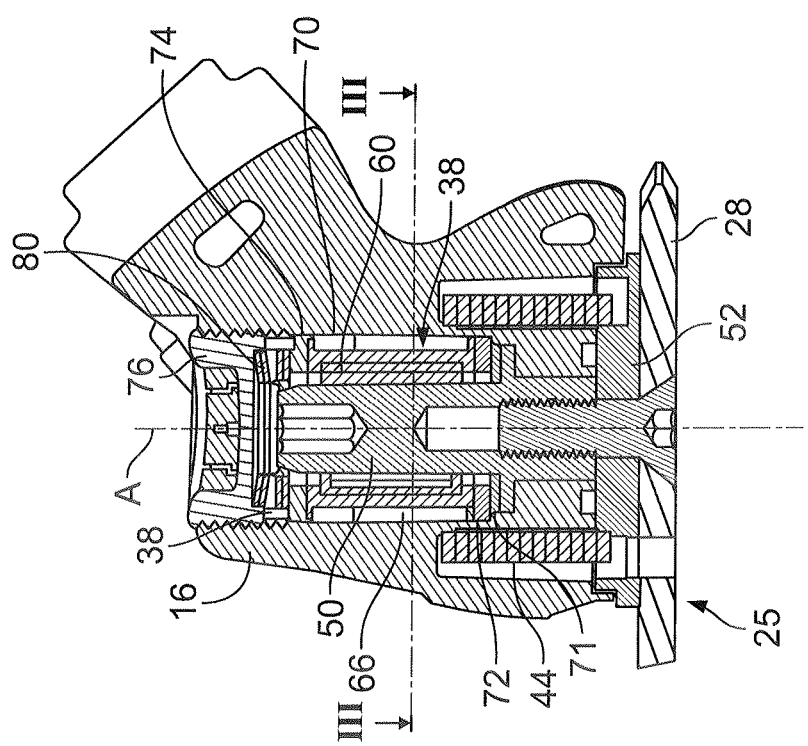

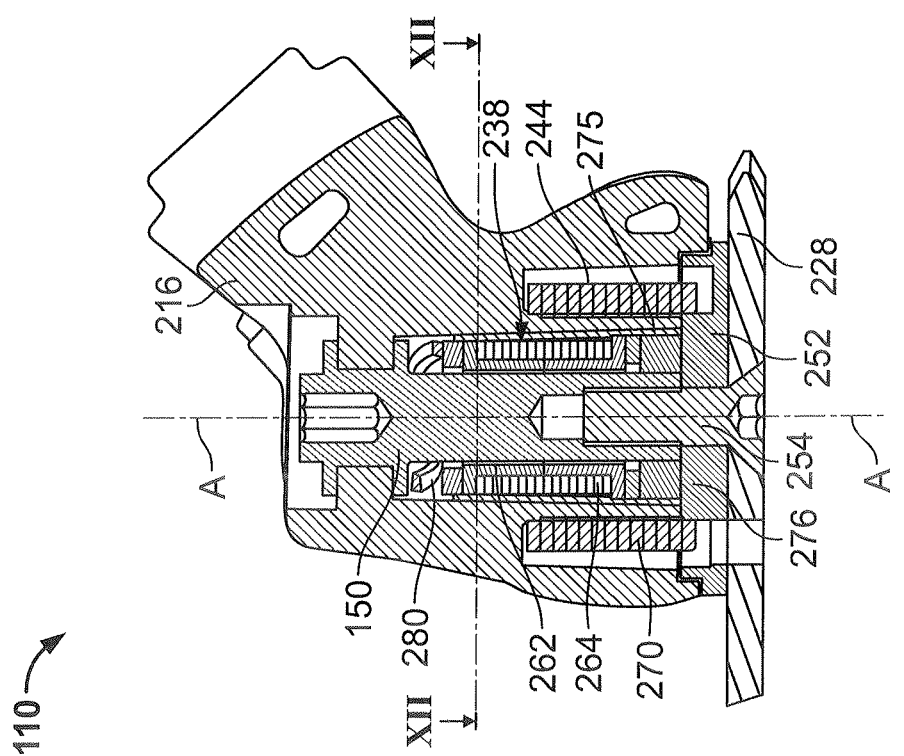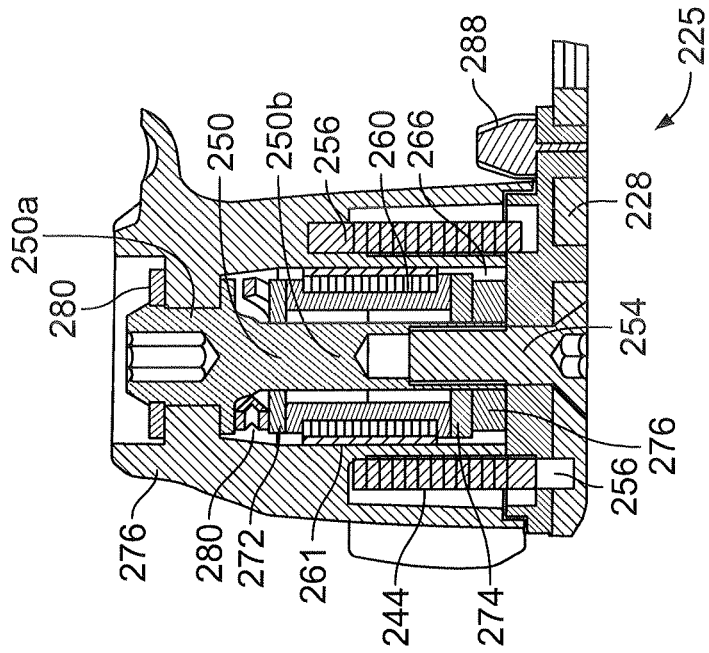

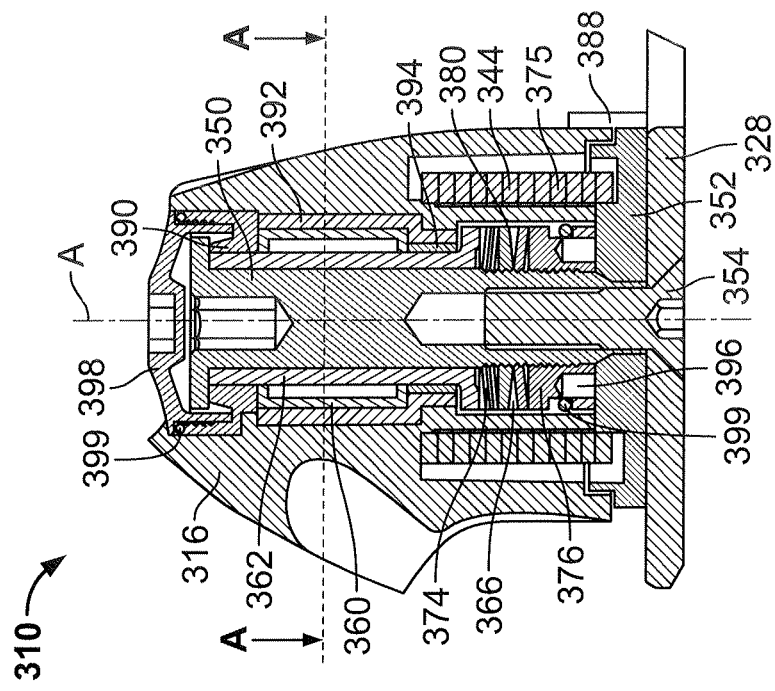
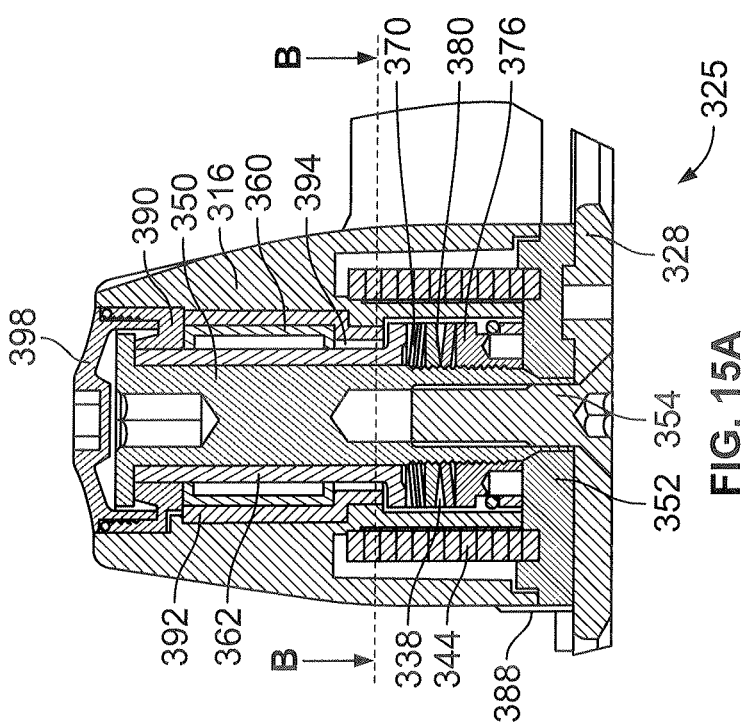
FIG. 15A
FIG. 15B

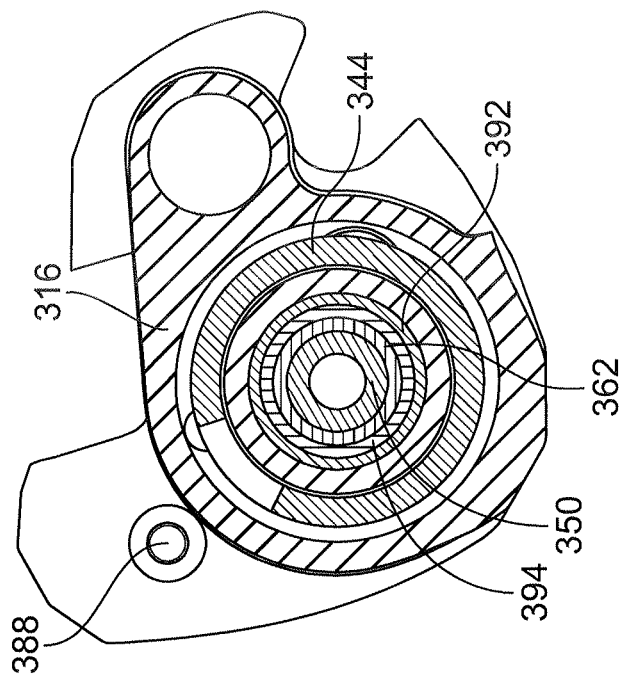
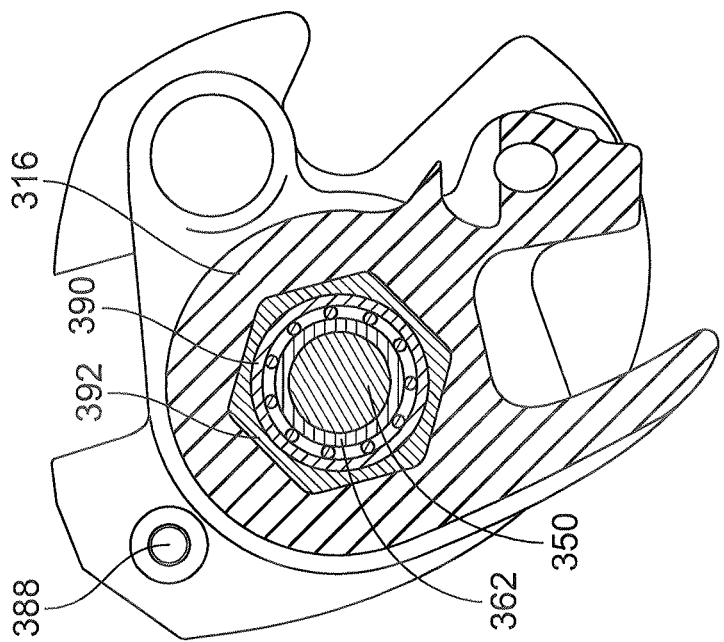
FIG. 16B
FIG. 16A

BICYCLE REAR DERAILLEUR WITH A DAMPER ASSEMBLY

BACKGROUND OF THE INVENTION

The present invention generally relates to bicycle rear derailleurs and more particularly to a bicycle rear derailleur with a damper assembly.

It is known that a bicycle derailleur performs shifting operations by shifting the chain between a plurality of adjacent sprockets of a sprocket assembly of a bicycle. A further, also very important function of the derailleur is to ensure sufficient chain tension. For this purpose, a bicycle derailleur generally has the following structure. A base member is mounted on the bicycle. Furthermore, a movable member is movably coupled to the base member and a chain guide assembly is movably coupled to the movable member with respect to rotation about a rotational axis. The movable member is movable in the lateral (axial) direction to move the chain guide assembly between the sprockets of the sprocket assembly so that the chain may be shifted from an initial sprocket to a target sprocket. The chain guide assembly is biased in a rotational direction rotation by a torsion spring or the like, namely in the direction of tensioning of the bicycle chain which is guided by the chain guide, to maintain the chain in the tensioned state or to restore the tensioned state after a prior state of insufficient chain tensioning. This rotational or pivoting direction is also referred to as "chain tensioning direction." A rotation of the chain guide in this direction increases the chain tension and, at the same time, reduces the tension of the torsion spring acting on the chain guide assembly. Depending on the current sprocket of the sprocket assembly with which the chain is engaged at a given point, the chain guide assembly will take various rotational positions relative to the movable member with regard to the rotational axis.

Impact on the chain and the chain guide assembly not only result from shifting of the derailleur by shifting the chain between various sprockets of the sprocket assembly, but also from riding itself. For example, when riding on uneven surfaces, the derailleur and the chain are subject to blows and vibrations which may act on the chain guide assembly in a rotational direction opposite to the "chain tensioning direction." A rotation of the chain guide assembly in the direction opposite to the "chain tensioning direction" increases the tension of the torsion spring that acts on the chain guide, and directly results in a reduction in the chain tension, or at least results in a greater risk of a subsequent reduction of the chain tensioning below the necessary level. Negative effects may be a drop in the chain tensioning with unwanted slackness or "dangling" of the chain. In a worst case, the chain may fall off the sprocket assembly.

In order to counter such problems, conventional solutions are provided with a damper assembly that provides a resistance to rotational movement of the chain guide assembly in the rotational direction of the chain guide assembly opposite to "chain tensioning direction." In this respect, the known solutions each have a one-way clutch and a friction device, which act together in such a way that the resistance regarding the rotational movement of the chain guide assembly is affected in a rotational direction opposite to the "chain tensioning direction."

The movable member and the chain guide assembly may be rotated relative to each other, but are frictionally coupled via the friction device and the one-way clutch assembly, which due to the characteristics of the one-way clutch is only effective in the rotational direction opposite the "chain tensioning direction," so that a dynamic friction is only present in this rotational direction to act against the rotation. In the other rotational direction corresponding to a backwards rotation of the chain guide in the sense of a tensioning chain, the chain guide assembly is decoupled from the movable member due to these one-way clutch characteristics, so that the tensioning of the chain by rotating the chain guide assembly encounters no resistance or at least only an irrelevant degree of resistance.

Such a derailleur is disclosed in DE 10 2007 040 156 A1. The derailleur includes a damper assembly having a friction device including a plurality of axially supported friction washers. A one-way roller clutch assembly is disposed radially outwardly of these friction washers in the same axial area, which results in the necessity of a relatively large dimension for the movable member in the radial direction. An advantage of this known solution is an adjustment unit having an exposed adjustment nut for adjusting the friction engagement and thus the damping force acting as resistance. This configuration allows the rider to adjust the damping force. However, for such an adjustment a tool is required and the question arises if an average rider has the necessary knowledge to adjust the damping force correctly. Further, the exposed adjustment nut is not protected from undesired rotation which may result in undesired adjustment of the damping force.

Other bicycle rear derailleurs with damper assemblies are disclosed in DE 10 2011 114 699 A1, which also use one-way roller clutches. The rotational axis of the chain guide assembly serves as an inner clutch member of the roller clutch. The friction device includes a leaf spring encircling an outer clutch member of the roller clutch and having two end portions radially protruding between the two rotational cams or alternatively between an adjustment screw and a rotational cam, which serve to adjust a basic friction and to control a momentarily acting friction via a control lever or the like, so that the bicyclist—according to his wishes, for example when riding on different terrain—may select the momentarily acting friction and thus the momentarily acting damping force by the control lever which is movable between two index positions. Providing the bicyclist with such a choice calls for a relatively high mechanical effort.

DE 19 2013 001 952 A1 discloses a rear derailleur that includes a sleeve-like friction element extending circumferentially around the roller clutch assembly and having a tapered or conical outer surface. The rotational axis rotatably supporting the chain guide assembly forms the inner clutch member of the roller clutch assembly.

EP 0 031 215 B1 discloses several different embodiments of a bicycle rear derailleur with a damper assembly. Generally, the damper assembly includes a one-way ratchet clutch and a friction device having axially arranged friction surfaces.

SUMMARY OF THE INVENTION

On object of the present invention is to provide a bicycle rear derailleur which has a compact structure and in particular is compact movable member in the radial direction.

One embodiment of the present invention provides a bicycle rear derailleur including a base member mountable to a bicycle frame. A movable member is movably coupled to the base member. A chain guide assembly rotatably connected to the movable member for rotation about a rotational axis. A biasing device is configured to bias the chain guide assembly for rotational in a first rotational direction with respect to the movable member. A damper assembly is operatively disposed between the chain guide assembly and the movable member to apply a damping force to the chain guide assembly when the chain guide assembly rotates in a second rotational direction opposite to the first rotational direction. The damper assembly includes a one-way roller clutch assembly and a friction device including a friction biasing device and friction surfaces axially biased against and in frictional engagement with the one-way roller clutch assembly by the friction biasing device, the friction surfaces being axially offset with reference to the rotational axis relative to the roller elements.

In one embodiment of the present invention, a radial expanse region of the roller clutch assembly, preferably at least an axial expanse region of the roller elements, overlaps with a radial expanse region of the friction surfaces, thereby making the radial compactness mentioned possible. The friction surfaces may be disposed so as to radially overlap with either the inner clutch member or the outer clutch member, with reference to the rotational axis.

The chain guide assembly may be connected to the movable member by a rotational shaft. The rotational shaft supporting the chain guide assembly for rotation about the rotational axis. The rotational shaft may form the inner clutch member of the roller clutch assembly. The rotational shaft is supported for rotation about the rotational axis in a cavity of the movable member. The cavity has a stepped configuration and forms a passage between opposite axial sides of the movable member. is supported axially with reference to at least one axial direction, directly or indirectly, on a related supporting formation of the movable member, by means of at least one supporting formation that extends in the axial direction, is in one piece with the rotational shaft or fixed in place on it. In this connection, it is especially considered that the rotational shaft is axially supported on the movable member, with reference to a first axial direction, by means of a supporting formation that is provided at a distance from the chain guide assembly, is in one piece with the rotational shaft or fixed in place on it, if desired by means of at least one supporting element separate from the movable member and accommodated in the cavity. As a further development, it is proposed that the supporting formation, which is preferably structured in one piece with the rotational shaft, for example structured as a flange section, is provided in an axial end region of the rotational shaft at a distance from the chain guide assembly.

The friction surfaces may be axially offset, with reference to the rotational axis, relative to at least either the inner clutch member or the outer clutch member.

It is advantageous if it is provided that an element of the chain guide assembly serves as a supporting formation for axial support of the rotational shaft on the movable member with reference to an axial direction, particularly with reference to a second axial direction opposite to the first axial direction.

In one embodiment of the friction device, the friction surfaces include first friction surfaces that can be biased against one another by a friction biasing device and second friction surfaces that are more closely adjacent relative to the first friction surfaces of the chain guide assembly. The second friction surfaces can be biased against one another by the friction biasing device. The roller elements of the roller clutch are disposed axially between the first friction surfaces, on the one hand, and the second friction surfaces, on the other hand, with reference to the rotational axis. In other words, the friction device can be structured to be axially distributed, and, in this connection, axial regions on both axial sides of the roller element of the roller clutch can be included, thereby making it possible to utilize the available axial construction space well, and accordingly also to achieve particularly axial compactness for the movable member, as well.

It can be provided that the first friction surfaces and the second friction surfaces have separate biasing elements assigned to them, which jointly form the friction biasing device. Thus, the friction biasing device may include a first biasing element and a second biasing element, wherein the roller elements of the roller clutch are disposed axially between the first biasing element, on the one hand, and the second biasing element, on the other hand, with reference to the rotational axis.

In contrast, however, the friction biasing device may be disposed in the immediate vicinity of the first friction surfaces and acts on the second friction surfaces by means of a force transfer device, or that the friction biasing device is disposed in the immediate vicinity of the second friction surfaces and acts on the first friction surface by means of a force transfer device. The bicycle derailleur may include a friction biasing device jointly assigned to the first and the second friction surfaces, which device is disposed in the immediate vicinity of either the first or the second friction surfaces, but is assigned to both the first and the second friction surfaces and acts on these directly or indirectly, which contributes to axial compactness. With regard to the force transfer device, it is furthermore proposed that either the inner clutch member or the outer clutch member forms the force transfer device or belongs to it or/and that at least one supporting element that extends axially, radially within or radially outside of the roller clutch, and is separate from the inner clutch member and the outer clutch member, forms the force transfer device or belongs to it. Thus, it is possible to do without additional components or to provide a separate supporting element that is structured as a sleeve element or the like, for example, which element can take up little radial construction space in the region of the roller clutch.

Another advantageous possibility with regard to the friction surfaces is that the friction surfaces are disposed on one axial side of the reference plane, with reference to a reference plane that intersects the roller clutch, orthogonal to the rotational axis, preferably axially offset relative to the roller elements of the roller clutch, most preferably axially offset relative to the roller clutch. In this connection, it is being considered, for example, that the friction surfaces are disposed on the axial side of the reference plane closer to the chain guide assembly. Preferably, the friction biasing device is disposed in the immediate vicinity of the friction surfaces, on the same axial side of the reference plane.

Embodiments that are relevant not just in connection with the implementation of the force transfer device addressed are characterized by at least one sleeve element that encloses the roller clutch radially on the outside, is coupled or can be coupled with the outer clutch member for common rotation, and serves, if desired, as a supporting element of the force transfer device, or/and characterized by at least one sleeve element that encloses the rotational shaft radially, is coupled or can be coupled with the rotational shaft, if desired, for common rotation, which element is enclosed radially on the outside by the roller clutch and, if desired, serves as a supporting element of the force transfer device, or forms the inner clutch member of the roller clutch.

To make available axially directed friction surfaces, it can be provided that one of the coupling elements of the roller clutch or a/the sleeve element that encloses the roller clutch or the rotational shaft radially on the outside has an end section that forms a friction surface of the axially directed friction surfaces or of the first or second friction surfaces. In the case of the sleeve element addressed, this can be a sleeve element of the force transfer device addressed. To make available axially directed friction surfaces having a sufficient surface area content, it is advisable to structure the end section of the coupling element in question or of the sleeve element as a flange section. It is advantageous if two such sleeve elements are provided, the flange sections of which are disposed at a distance from the other sleeve element, in each instance. However, only a single such sleeve element is also easily sufficient.

With regard to the embodiment possibility with only one sleeve element, it is proposed, as a further development, that the sleeve element that encloses the rotational shaft radially on the outside is axially supported on a supporting formation of the rotational shaft, at an end section that lies opposite to the end section that forms the friction surface, wherein this supporting formation preferably also serves for direct or indirect axial support of the rotational shaft on the movable member.

Embodiments are wherein at least one washer or ring washer that is fixed in place or can be fixed in place in torque-proof manner, in the movable member, or/and at least one inner surface of the movable member forms a friction surface of the axially directed friction surfaces or of the first or second friction surfaces, or that at least one washer or ring washer that is coupled or can be coupled with the rotational shaft for common rotation or/and at least one surface of a radially projecting section of the rotational shaft forms a friction surface of the axially directed friction surfaces or of the first or second friction surfaces.

As a further development, it is proposed that at least one fixed washer or ring washer or at least one such fixable washer or ring washer is axially displaceable in the case of the state of fixation relative to the movable member or relative to the rotational shaft, in view of the bias of the friction surfaces into the reciprocal friction engagement by the friction biasing device.

The outer clutch member can be coupled with the movable member in torque-proof manner or with friction fit by means of the friction surfaces. The rotational shaft can form the inner clutch member or can be coupled with it in torque-proof manner or with friction fit by means of the friction surfaces. In this connection, it should be especially considered that the inner clutch member is formed by at least one sleeve element.

The following embodiments are specifically considered: i) the outer clutch member is coupled with the movable member with friction fit by means of the friction surfaces, and the rotational shaft forms the inner clutch member or is connected with it in torque-proof manner; and ii) the outer clutch member is coupled with the movable member in torque-proof manner, and the rotational shaft is connected with the inner clutch member with friction fit by means of the friction surfaces.

It can be provided that structurally unchangeable structures of the bicycle derailleur, which are not adjustable even during manufacture, bring about a defined tension state of the friction biasing device. In contrast, however, it is preferred that a defined tension state of the friction biasing device, preferably structured as a corrugated spring arrangement or plate spring arrangement, is adjusted, during manufacture of the bicycle derailleur, by means of a supporting element that can be axially positioned relative to at least either the movable member or the rotational shaft, in defined manner, within a predetermined axial adjustment range, and can be axially supported, preferably in the form of an adjusting element structured in the form of a screw element, for example.

Several embodiments include the friction biasing device disposed axially between the chain guide assembly, on the one hand, and the supporting element, on the other hand, and, in this connection, is disposed preferably axially between the roller clutch, on the one hand, and the supporting element, on the other hand.

Several embodiments include the supporting element, particularly adjusting element, disposed axially between the chain guide assembly, on the one hand, and the roller clutch, on the other hand. For this purpose, the possibility exists, on the one hand, that the friction biasing device is disposed axially between the roller clutch, on the one hand, and the supporting element, particularly adjusting element, on the other hand. On the other hand, it can be provided that the roller clutch is disposed axially between the friction biasing device, on the one hand, and the supporting element, particularly adjusting element, on the other hand.

In general, it is an idea that the supporting element is structured as an adjusting element and stands in engagement, on an outer thread, with an inner thread of the movable member or, on an inner thread, with an outer thread of the rotational shaft. Preferably, it is provided that the supporting element or adjusting element is disposed so as to be secured against adjustment or/and hidden, and preferably inaccessible. In view of the risk of incorrect adjustments by a bicyclist or also by a technician in a bicycle workshop, a change in a factory setting of the tension state and thereby of the counterforce is not desirable, and should be made more difficult or, ideally, actually practically impossible.

With regard to the chain guide biasing device, it is proposed that this device is disposed, with reference to the rotational axis, radially outside of a radial expanse region of the friction surfaces and axially overlapping with at least some of the friction surfaces, preferably the second friction surfaces, or/and with the supporting element or adjusting element, or/and with the friction biasing device, and radially enclosing this device or this element or these surfaces.

The invention also makes available a preassembly unit for production of a bicycle rear derailleur according to the invention, in different embodiments. A first embodiment is wherein the preassembly unit includes a movable member configured to be movably coupled with a base member. A rotational shaft configured to be connected with a chain guide assembly and is mounted so as to rotate about a rotational axis, in a cavity of the movable member of the movable member. The cavity structured in stepped manner as a passage between opposite axial sides of the movable member. The shaft is axially supported or can be axially supported by the movable member, in a first of the axial directions, if desired by means of at least one supporting element accommodated in the cavity; a one-way clutch assembly and a friction device, which are disposed in the cavity, radially enclosing the rotational shaft, and, if desired, including the rotational shaft as a coupling element of the one-way clutch assembly, and with which devices a damper assembly can be formed, with the inclusion of an biasing device assigned to the friction device, wherein the one-way clutch assembly has a roller clutch and the friction device has essentially axially directed friction surfaces that stand in reciprocal friction engagement or can be brought into reciprocal friction engagement, with reference to the rotational axis, which surfaces, with reference to the rotational axis, are axially offset relative to roller elements of the roller clutch that are in effect between a radially inner clutch member and a radially outer clutch member of the roller clutch.

Furthermore, in this connection, in other words relating to the first embodiment, it is proposed that the rotational shaft can be connected with the chain guide assembly at a first axial end, preferably achieving direct axial support or supportability for the rotational shaft in a second axial direction opposite to the first axial direction, and the elastic force storage unit can be positioned in the cavity in the vicinity of a second end of the rotational shaft, opposite to the first end, and an adjusting element that can be positioned in the cavity in defined manner, and axially fixed in place, for example can be screwed into an inner thread of the cavity with an outside thread, can be braced in place, in order to brace the friction surfaces into reciprocal friction engagement.

A second embodiment is wherein the preassembly unit includes: a movable member that is movably coupled or can be movably coupled with a base member and has a cavity structured in stepped manner, which is structured as a passage between opposite axial sides of the movable member, with reference to an axis, and in which a rotational shaft that can be connected with a chain guide assembly is mounted or can be mounted so as to rotate about a rotational axis corresponding to the axis, and which is axially supported or can be axially supported by the movable member, in a first of the axial directions, if desired by means of at least one supporting element accommodated in the cavity; a one-way clutch assembly or at least a sub-device of the one-way clutch assembly, as well as a friction device having a friction biasing device, which are disposed in the cavity, leaving a passage that lies radially on the inside, for the rotational shaft that is to be included or has been included as a coupling element of the one-way clutch assembly, if desired, which shaft can be pushed into or has been pushed into the cavity, to form a damper assembly, wherein the one-way clutch assembly or the sub-device comprises a roller clutch or at least an outer clutch member of the roller clutch, with roller elements held on it radially on the inside, and the friction device has essentially axially directed friction surfaces, with reference to the rotational axis, that stand in reciprocal friction engagement or can be brought into reciprocal friction engagement, which surfaces can be biased against one another by means of the biasing device assigned to or belonging to the friction device, wherein the friction surfaces, with reference to the rotational axis, are axially offset relative to roller elements of the roller clutch that are in effect between a radially inner clutch member and a radially outer clutch member of the roller clutch.

Furthermore, in this connection, in other words relating to the second embodiment, it is proposed that an adjusting element that has a passage assigned to the rotational shaft is positioned in the cavity in defined manner and axially fixed in place in a first axial end region of the cavity, for example screwed into an inner thread of the cavity with an outside thread, which element braces the biasing device in order to brace the friction surfaces into reciprocal friction engagement; and that the rotational shaft can be pushed into or has been pushed into the cavity from an end region of the cavity opposite to the first end region, and the pushed-in rotational shaft can be connected with the chain guide assembly at an end disposed in the first axial end region, preferably achieving direct axial support or supportability for the rotational shaft in a second axial direction opposite to the first axial direction.

A third embodiment is wherein the preassembly unit includes: a rotational shaft that can be connected with a chain guide assembly at a first end, in order to mount the module so as to rotate about an rotational axis, by means of the rotational shaft, in a cavity of the movable member that is or can be movably coupled with a base member, structured in stepped manner, forming a passage between opposite axial sides of a movable member; a one-way clutch assembly and a friction device having a friction biasing device, which devices are disposed on the rotational shaft, radially enclosing it and, if desired, including the rotational shaft as a coupling element of the one-way clutch assembly, to form a damper assembly, wherein the one-way clutch assembly has a roller clutch and the friction device has essentially axially directed friction surfaces, with reference to the rotational axis, that stand in reciprocal friction engagement or can be brought into reciprocal friction engagement, which surfaces can be biased against one another by the friction biasing device, wherein the friction surfaces are axially offset, with reference to the rotational axis, relative to roller elements of the roller clutch that are in effect between a radially inner clutch member and a radially outer clutch member of the roller clutch.

Furthermore, in this connection, in other words relating to the third embodiment, it is proposed that an adjusting element is positioned on the rotational shaft in defined manner, and axially fixed in place, for example screwed onto an outside thread of the rotational shaft with an inner thread on an inner circumference, in the vicinity of a first axial end of the rotational shaft, which element braces the biasing device in order to brace the friction surfaces into reciprocal friction engagement; and that the rotational shaft can be connected with the chain guide assembly at the first axial end, and the rotational shaft can be assembled with the movable member, in that the rotational shaft is pushed into the cavity from a first axial side of the movable member, with a second end opposite to the first end leading, and secured on the movable member from being pulled out of the cavity, at an end region adjacent to the second end, from the second axial side of the movable member opposite to the first axial side.

A fourth embodiment is wherein the preassembly unit includes: a movable member that is or can be movably coupled with a base member and has a stepped cavity, which is structured as a passage between opposite axial sides of the movable member, with reference to an axis, and in which cavity a rotational shaft that can be connected with a chain guide assembly is mounted to as to rotate about an axis corresponding to the rotational axis and is or can be axially supported in a first of the axial directions, by means of the movable member, if desired by means of at least one supporting element accommodated in the cavity; a one-way clutch assembly and a friction device having a friction biasing device, which devices are disposed on the rotational shaft, radially enclosing it and, if desired, including the rotational shaft as a clutch member of the one-way clutch assembly, to form a damper assembly, wherein the one-way clutch assembly has a roller clutch and the friction device has essentially axially directed friction surfaces, with reference to the rotational axis, that stand in reciprocal friction engagement or can be brought into reciprocal friction engagement, which surfaces can be biased against one another by means of the friction biasing device, wherein the friction surfaces are axially offset, with reference to the rotational axis, relative to roller elements of the roller clutch that are in effect between a radially inner clutch member and a radially outer clutch member of the roller clutch.

Furthermore, in this connection, in other words relating to the fourth embodiment, it is proposed that an adjusting element is positioned on the rotational shaft in defined manner, and axially fixed in place, for example screwed onto an outside thread of the rotational shaft with an inner thread on an inner circumference, in the vicinity of a first axial end of the rotational shaft, which element braces the biasing device in order to brace the friction surfaces into reciprocal friction engagement; wherein the rotational shaft can be connected with the chain guide assembly at the first axial end, preferably achieving indirect axial support of supportability for the rotational shaft in a second axial direction, opposite to the first axial direction.

Preferred embodiments of a bicycle rear derailleur are wherein the outer clutch member is coupled with the movable member with friction fit, by way of the friction surfaces, to produce counterforces that counteract rotation of the outer element, and that the/a rotational shaft forms the inner clutch member or is torque-proof relative to it. Such a bicycle derailleur can be produced in particularly practical manner from a preassembly unit according to the first embodiment or the second embodiment.

Further preferred embodiments of a bicycle rear derailleur according to the invention are wherein the outer clutch member is torque-proof relative to the movable member, preferably on the basis of a shape-fit connection, and that the/a rotational shaft is coupled with the inner clutch member with friction fit, by way of the friction surfaces, for transfer of entrainment forces. Such a bicycle rear derailleur can be produced in particularly practical manner from a preassembly unit according to the third or fourth embodiment.

Practical embodiments of a bicycle rear derailleur are wherein the rotational shaft is secured on the movable member to prevent it from being pulled out of the cavity, by means of a preferably releasable holding means, for example by means of a circlip, which axially supports the rotational shaft on the movable member in a first one of the axial directions, if desired by means of at least one supporting element accommodated in the cavity. Such a bicycle derailleur can also be produced in practical manner from a preassembly unit according to the third embodiment. As a further development, it is proposed that the rotational shaft is supported or can be supported on the movable member in a second axial direction opposite to the first axial direction, by means of the chain guide assembly or/and by means of a stop of the rotational shaft, within the cavity.

The invention furthermore also makes available a method for the production of a bicycle rear derailleur according to the invention. A preferred embodiment of the invention is wherein first, a preassembly unit according to one of the embodiments addressed is produced, and that this is then combined with missing components, in order to form the bicycle derailleur according to the invention. In the case that the adjusting element is provided, this element is adjusted in such a manner, during the course of production of the preassembly unit, that the damper assembly of the finished bicycle derailleur exerts the desired counterforce during operation. To the extent that adjustment or calibration is provided, this should preferably take place using the preassembly unit. This is particularly advantageously possible in the case of the preassembly units according to the second, the third, and the fourth embodiment.

These and other features and advantages of the present invention will be more fully understood from the following description of one or more embodiments of the invention, taken together with the accompanying drawings.

DETAILED DESCRIPTION OF THE DRAWINGS

In the drawings:

FIGS. 2a and 2b are two cross-sectional views of the damper assembly taken along two planes that include a rotational axis of a chain guide assembly, the planes being offset at an angle relative to one another;

FIG. 3 is a cross-sectional view through the damper assembly taken along the section line III-111 in FIG. 2a;

FIG. 7 is a cross-sectional view through the damper assembly taken along the section line VII-VII in FIG. 6a;

FIGS. 11a and 11b are cross-sectional views through the damper assembly of the embodiment of FIG. 10, taken along planes similar to planes in FIGS. 2a and 2b;

FIG. 12 is a cross-sectional view through the damper assembly taken along section line XII-XII in FIG. 11a;

FIGS. 15a and 15b are sectional views of a fourth embodiment of a derailleur according to the invention, having a damper assembly according to the invention, according to a fourth design approach, in views corresponding to FIGS. 2a and 2b;

FIG. 16a is a cross-sectional view through the damper assembly taken along the section line A-A in FIG. 15b;

FIG. 16b is a cross-sectional view through the damper assembly taken along the section line B-B in FIG. 15a.

DETAILED DESCRIPTION

Figure 1:
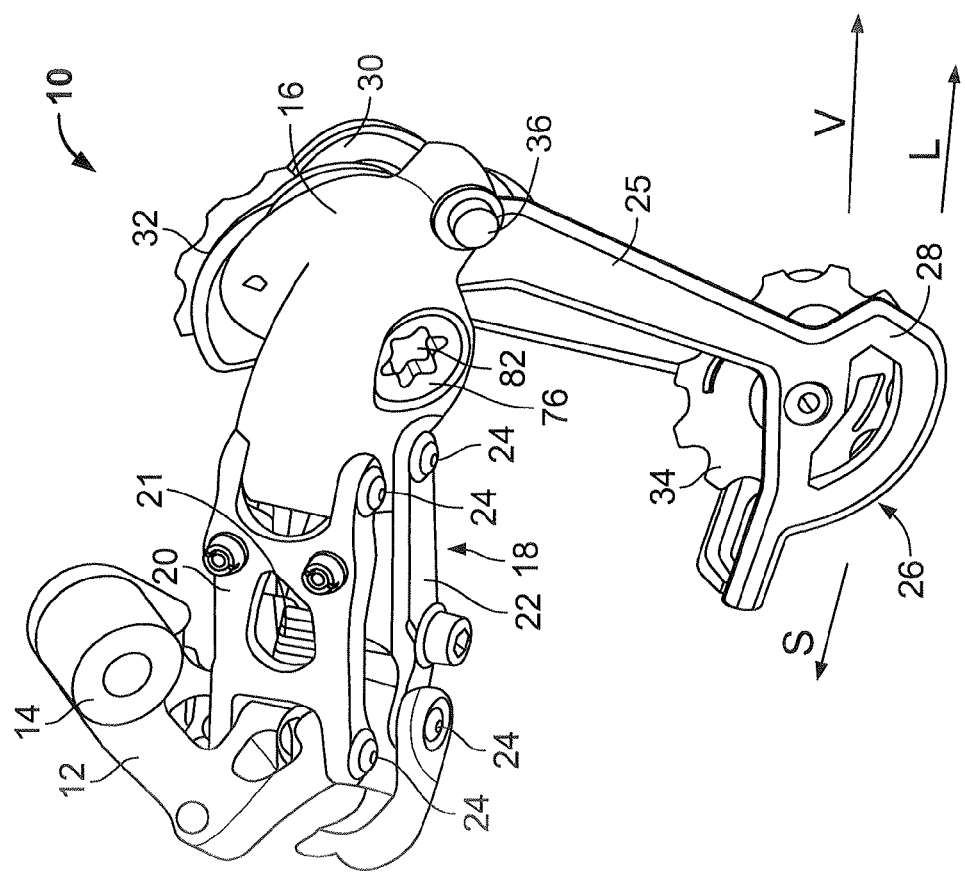
FIG. 1 is a perspective view of a bicycle rear derailleur including a damper assembly according to one embodiment of the present invention.
Figure 3:
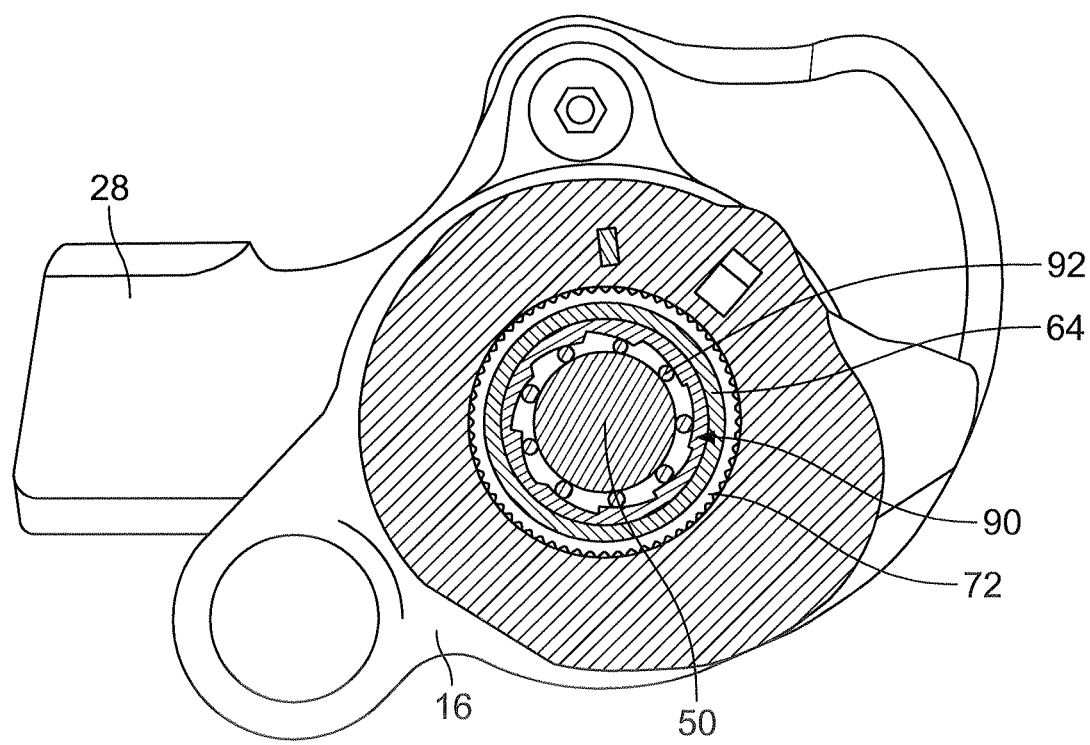
Figure 4:
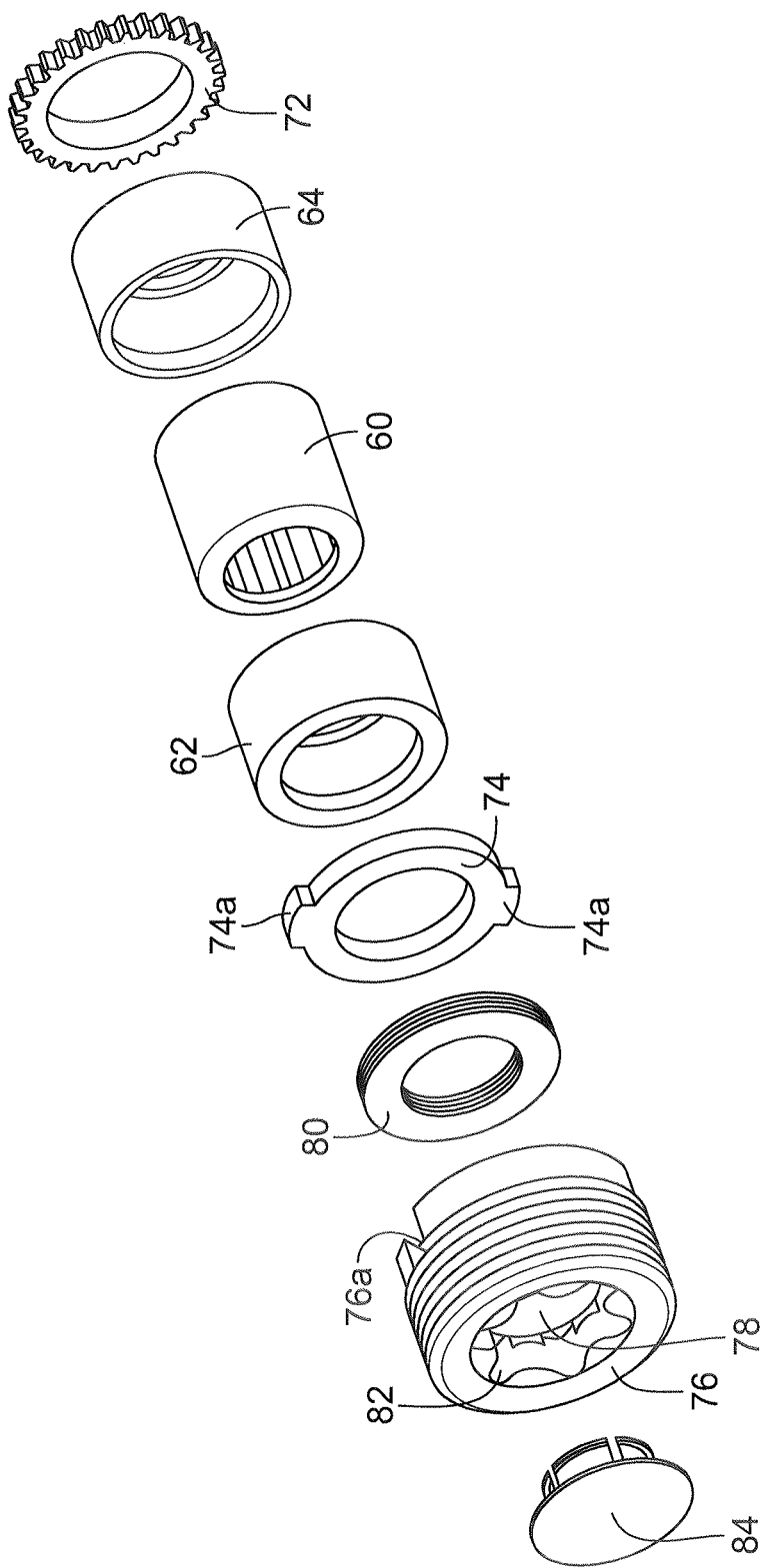
FIG. 4 is an exploded perspective view of components of the damper assembly.
Figure 5:
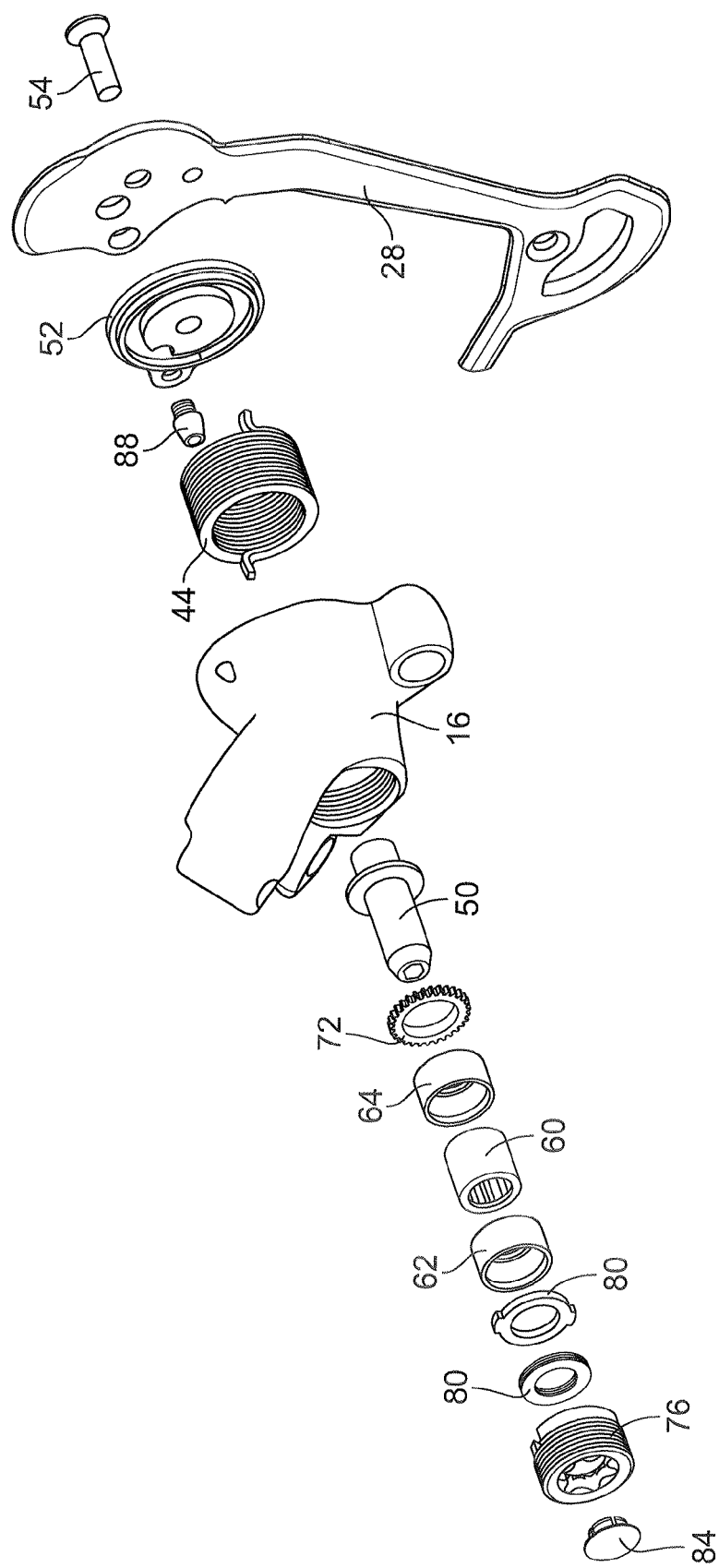
FIG. 5 is an exploded perspective view of the components of the damper assembly, along with further components of the derailleur.

Several embodiments of the invention will herein be described with reference to the drawings. It will be understood that the drawings and the description set out herein are provided for illustration only and do not limit the invention as defined by the claims appended hereto and any and all equivalence. For example, terms such as "first" and "second," "upper" and "lower," or "forward" and "rearward" are used for the sake of orientation and not as terms of limitation. Moreover, the terms preferably refer to the bicycle derailleur conventionally mounted to a bicycle and with the bicycle orientated for normal use unless otherwise indicated.

For example, the front of an element would be that part of the element oriented/closest to the front of the bicycle.

Looking to FIGS. 1-5, a bicycle derailleur 10 is shown according to one embodiment of the present invention. The bicycle derailleur 10 generally includes a base member 12, a movable member 16, a swing linkage 18, a chain guide assembly 25 and a damper assembly 38. The base member 12, also known as a b-knuckle," may be mounted to a bicycle frame by a fastening element 14 such as a screw of the like. The swing linkage 18, in this embodiment a parallelogram, includes outer and inner links 20, 22 pivotally connected to the base member 12 by a pair of pivot pins 24 or bolts. The movable member 16, also known as a "p-knuckle," is pivotally connected to the links 20, 22 at ends of the links 20, 22 opposite the base member 12. The movable member 16 is pivotally connected by a pair of further pivot pins 24 to the swing linkage 18 in a similar manner as the base member 12. In principle, various means for coupling the movable member 16 with the base member 12 are imaginable within the scope of the invention.

The movable member 16 is movable by the swing linkage 18 in a well-known manner in a lateral direction relative to the bicycle frame to shift a chain by the chain guide assembly 25 between the sprockets of a sprocket assembly mounted to the rear wheel of the bicycle. The swing linkage 18 includes a biasing device 21, in this embodiment a spring, to tension the derailleur 10 in the direction of an initial travel position as is common knowledge in this field of expertise. The chain guide assembly 25 is rotatably mounted to the movable member 16 about a rotational axis A and is biased in a chain tensioning direction S by a biasing device, in this embodiment torsion spring 44 (see FIGS. 2a and 2b). Looking to FIG. 1, a forward direction V corresponds to the forward direction of a bicycle. A rotational direction of the chain guide assembly 25, in which the guided chain is tensioned, is denoted with S. The rotational direction in the forward direction V opposite to the chain tensioning direction s is denoted by chain slackening direction L. Rotations of the chain guide assembly 25 in the chain slackening direction L may result in an undesired reduction of chain tensioning which may result in the chain disengaging with one of the sprockets. The chain guide assembly 26 includes an outer plate 28 and inner plate 30, spaced apart. An upper guide wheel 32 and a lower guide wheel 34 are rotatably arranged between the outer and inner plates 28 and 30 for receiving the chain, not shown.

As shown in FIG. 1, the movable member 16 may include a chain guide locking mechanism 36 that fixes the chain guide assembly 25 in a certain rotational position with respect to the movable member 16 so that maintenance work may be easily performed. Looking to FIGS. 2a and 2b, the outer plate 28 is connected in a rotatably fixed manner with a rotational shaft 50 which is supported for rotation in a cavity 90 of the movable member 16. The cavity 66 may form a passage extending between opposite first and second axial sides 65, 63 of the movable member 16. An intermediate washer 52 is located between the outer cage plate 28 and the movable member 16. The intermediate washer 52 is connected to the cage plate 28 in a rotatably fixed manner by protrusions that engage in openings in the plate. The cage plate, including the intermediate washer, is connected with the rotational shaft 50 by a screw 54 being screwed into an inner thread of the rotational shaft 50. The biasing device 44, in this embodiment a torsion spring, engages on the one hand with a coupling portion at 54 in a positive-locking manner in the movable member 16 and on the other hand with a coupling portion at 56 in a positive-locking manner in the intermediate washer 52 and the outer plate 28, so that the spring 44 biases the chain guide assembly 26 in the chain tensioning direction S to maintain or restore the necessary tensioning of the chain which is engaged in the usual manner with the guide wheels 32, 34.

The damper assembly 38 includes a one-way clutch assembly in the form of a roller clutch assembly 60 of the usual design, having an inner clutch member and an outer clutch member and roller elements that act between the inner and outer clutch members. The inner clutch member may be a sleeve or the like, affixed to the rotational shaft in rotatably fixed manner. Alternatively, the rotational shaft 50 may be the inner clutch member of the roller clutch, as in the embodiment described.

The roller clutch assembly 60 is configured in such a manner that the direction of rotation of the rotational shaft 50 that corresponds to the chain tensioning direction S is the free-running direction of the roller clutch, in which the inner clutch member may rotate freely relative to the outer clutch member, and that the pivoting direction L opposite to the chain tensioning direction S corresponds to the locking direction of the roller clutch assembly, in which rotation of the inner clutch member relative to the outer clutch member of the roller clutch is locked, so that the rotational shaft 50 and thereby the chain guide assembly 25 may rotate in this direction only with entrainment of the outer clutch member.

The roller clutch can advantageously be formed by what is called a sleeve freewheel, a sleeve-like element on the inner circumference of which the roller elements are held and which is combined with the rotational shaft 50 that serves as the inner clutch member.

The outer clutch member of the roller clutch 60 is coupled with a friction device 70. In this embodiment, it is an indirect coupling by two sleeve-like element 62 and 64, in which the roller clutch is accommodated in torque-proof manner, for example with press fit, and structured, at the two axial ends, with reference to the rotational axis A of the rotational shaft 50 of the sleeve arrangement formed in this manner, with a flange section that makes an axially directed friction surface available. The sleeve 64 that is axially closer in the representation of FIGS. 2a and 2b of the chain guide assembly engages, with its ring-shaped friction surface of its end flange, on a friction washer 72 that is fixed in place in torque-proof manner in the movable member 16 and is axially supported on a step 71 of the cavity 66. Torque-proof fixation of the friction washer 72 can be brought about, for example, in that the friction washer is structured with knurling on its outside circumference and is pressed into the cavity 66, making contact with the step 71.

The sleeve 62 that is axially farther away from the chain guide assembly 25 also engages with a friction washer 74 on its ring friction surface of its end flange. The washer 74 is also disposed in the cavity 66 of the movable member 16 in torque-proof manner, however without direct axial support on the movable member. The cavity 66 has an inner thread 75 on its end region that is farther away from the chain guide assembly 25, into which a threaded screw element 76 is screwed, which closes off the cavity 66, which is structured as a stepped passage bore, on this side of the movable member 16 that is axially removed from the chain guide assembly 25, and has a recess 78 on its inner side, into which the axially inner end of the rotational shaft 50 projects, and in which the friction washer 74 and a biasing device, indicated as 80, in this embodiment of plurality of plate springs, are accommodated. The friction washer 74 is structured with at least one radially projecting projection 74a, which engages into a radial recess 76a of the screw element 76 that is open toward the recess 78, so that the friction washer 74 cannot be rotated relative to the screw element 76.

The friction washer 74 is axially biased against the sleeve element 62 by the biasing device 80, thereby resulting in a corresponding axial bias of the sleeve element 64 against the friction washer 72, because the corresponding bias force is axially transferred by way of the sleeves 62 and 64, bridging the roller clutch 60. The bias force applied by the biasing device 80 therefore determines the friction-fit engagement between the axially oriented friction surfaces of the flange end section of the sleeve element 62 and the friction washer 74, on the one hand, and the axially directed friction surfaces of the flange end section of the sleeve element 64 and the friction washer 72, on the other hand.

During manufacture of the derailleur, the screw element 76, which serves as an adjusting element in this regard, is screwed into the inner thread 74 of the cavity 66 of the movable member 16 to such an extent that a bias of the friction surfaces addressed, against one another, results, which bias brings about a required friction-fit counterforce against rotation of the chain guide assembly 25 in the pivot direction L. In this pivot direction L, the roller clutch 60 locks so that the rotational shaft 50 entrains the outer clutch member of the roller clutch and thereby the sleeve elements 62 and 64 as it rotates, so that the axially directed friction surfaces of the sleeves 62 and 64 rotate relative to the assigned friction surface of the friction washer 72 and 74, respectively, so that the friction that occurs makes pivoting of the chain guide assembly in this direction L more difficult. In other words, a counterforce that counteracts pivoting in this pivoting direction, applied as the result of friction, occurs. The amount of this counterforce depends on how deeply the screw element 76 has been screwed into the inner thread 75 of the cavity 66.

In order to be able to screw the screw element 76 into the inner thread 75 accordingly, during manufacture of the derailleur, and thereby to set the counterforce that occurs during operation, the screw element 76 has a tool engagement opening with rotational entrainment information on an inner circumference of the screw element.

In a finished derailleur, the screw element 76 is preferably secured to prevent rotation, by a glue bond between the inner thread 75 of the movable member 16 and the complementary outer thread of the screw element 76, and the tool engagement opening 82 is secured by a cover cap 84 that has been snapped into it and preferably also glued in place, so that the screw element 76 is not accessible for activation and is secured to prevent rotation. In this way, adjustments of the friction engagement, and thereby of the resulting counterforce, as compared with factory settings, or calibration and adjustment may be prevented. FIG. 1 shows the derailleur in a state that is not the state preferred according to the invention, because the cap 84 is not mounted in the recess 82. In this regard, this can be a state just before final completion of the derailleur. Setting and calibration of the friction fit, as addressed, and then securing of the screw element to prevent activation, by the cap 84, can, however, also take place in a state of the derailleur that is otherwise not yet complete, for example before the movable member 16 is connected with the swing linkage 18.

Further details of the derailleur according to the first embodiment are easily evident to a person skilled in the art from the related figures. A stop screw or a stop pin for limiting the pivot angle of the chain guide assembly is indicated with 88. It is also evident from the exploded views of FIGS. 4 and 5 how and in what sequence the components of the damper assembly 38 are to be accommodated in the cavity 66 of the movable member 16. The structure of the roller clutch assembly 60 to be provided, for example, can also be recognized in greater detail from FIG. 3, with the rotational shaft 50 as an inner clutch member, an outer clutch member 90 structured on the outside circumference in known manner, and a plurality of roller elements 92 between the two clutch members. The knurling of the friction washer 72 on its outside circumference, as already addressed, is indicated.

It should still be noted that the rotational shaft 50 has a tool engagement opening on its end opposite to the screw 54, which opening serves for supporting rotational forces that act on the rotational shaft 50 when the screw 54 is screwed in for assembly of the intermediate washer 52 and of the cage plate 78 onto the screw shaft, during this screwing procedure. If this tool engagement opening is utilized during assembly of the components addressed, the biasing element 80 and the screw element 76 must be positioned in the cavity 66 or screwed into the inner thread 75 only afterward.

Preferably, roller clutch 60 is in press-fit engagement with the sleeve elements 62 and 64, in order to secure these axially to prevent rotation on the outer clutch member. Other types of rotational coupling can also be provided. For example, there are sleeve freewheels having knurling on the outside circumference, which can be used for production of a torque-proof connection. However, it is also possible to do without an additional sleeve arrangement such as the sleeves 62 and 64 and to structure the outer clutch member with friction surfaces having a sufficient surface area content at the axial ends, for example with corresponding flange sections.

With regard to the screw element 76 that serves for setting the friction engagement, it should be noted that other types of adjusting elements are also possible, without a screw connection with the movable member. For example, a corresponding adjusting element could also be accommodated in the end section of the cavity 66 with press fit. A bayonet closure element, which engages on the inner circumference of the cavity 66 with assigned bayonet engagement formations, is also possible.

With regard to the rotational support of the friction washers 72 and 74, other configurations are also possible. For example, the friction washer 72 could also be structured with at least one radial projection, which engages into a complementary formation on the inner circumference of the cavity 66. Rotational support can take place, in general, by at least one projecting projection, a wedge formation, or by means of a pin characteristic, for example.

With regard to this embodiment, it should still be noted, in total, that not only axial but also radial compactness is made possible for the movable member 16. For example, the axially directed friction surfaces overlap with the roller clutch 60, at least with the outer clutch member and, if desired, also with the roller elements, in the radial direction. The available axial construction space is utilized well by means of axially directed friction surfaces on both axial sides of the roller clutch and only one biasing device 80 in the form of a plurality of plate springs in the present case (other types of springs are also possible, for example corrugated springs or torsion pressure springs).

FIGS. 6 to 9 show a second embodiment of the present invention. Here, only the changes as compared with the first embodiment will be explained. The same reference symbols as for the first embodiment are used for corresponding or analogous components, increased by 100, respectively.

The second embodiment is very similar to the first embodiment in terms of structure and function. The essential difference lies in that the friction biasing device 180 (in the form of a corrugated spring in the case of the embodiment) as an adjusting element for the bias, together with this force storage arrangement, is disposed in an end region of the cavity 166 of the movable member 116 that is structured as a stepped passage bore, which region is closer to the chain guide assembly 125, for which reason the inner thread 175 of the cavity 166 is provided in the end region of the cavity that borders on the intermediate washer 152. Without any restriction of generality, the individual element is therefore once again structured as a screw element 176, with a passage for the rotational shaft 250 structured as a tool engagement opening. The cage plate 128 with the intermediate washer 152 is connected with the rotational shaft 150 introduced from the opposite side of the movable member 116, by the screw 154. The rotational shaft has a tool engagement opening at the other shaft end, so that the screw 154 can be tightened easily. The corrugated spring 180 acts on the friction washer 174, which is disposed fixed in place in torque-proof manner but axially movable in the cavity, by means of three radial projections 174a, for example, in order to transfer the bias force to the friction washer 172 that is axially supported on a shoulder in the cavity 166, by way of the sleeve arrangement 162, 164, which plate is secured in the cavity 166, to prevent rotation, by means of knurling on the outside circumference, for example. Once again, the friction surfaces on the flange-like end sections of the sleeve 162 and the sleeve 164 and the friction surfaces of the friction washers 172 and 174 that engage with them serve as axially directed friction surfaces.

The screw element 176 or a different adjusting element, in comparison, for example as mentioned as alternatives in connection with the first embodiment, is disposed hidden in the interior of the finished derailleur, more precisely in the interior of the cavity 166, and covered by the intermediate washer 152 and the cage plates, so that no special security measures to prevent unauthorized adjustment as compared with the factory settings are required, except, if necessary, the use of a glue bond between the outside thread of the screw element 176 and the inner thread of the cavity 166, in order to secure the setting to prevent rotation due to vibrations and shocks. In view of an esthetic appearance, however, the opposite end region of the cavity 166, in which the rotational shaft 150 is axially supported on the movable member 166 by means of a projecting ring flange, can be provided with a cover cap.

The same advantages with regard to axial and radial compactness of the movable member are achieved as in the first embodiment. All the embodiment embodiments mentioned with regard to the first embodiment are analogously possible embodiment embodiments of the second embodiment.

Figure 6B:
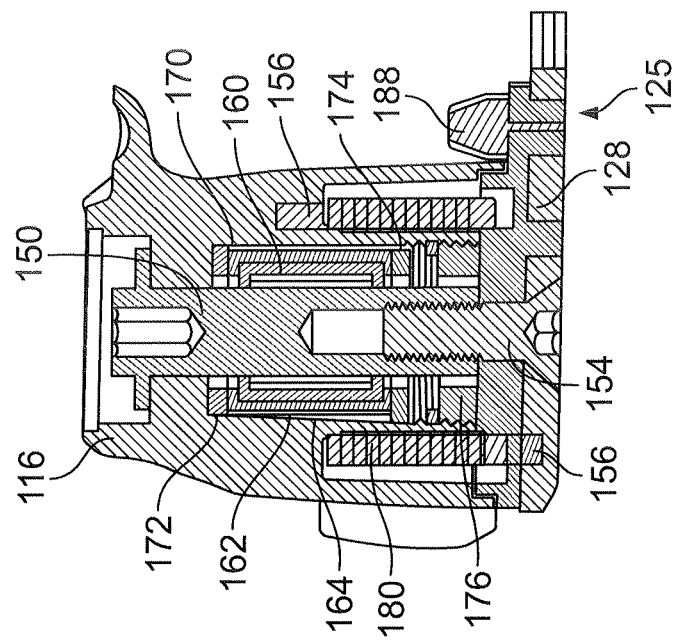
FIGS. 6a and 6b are cross-sectional views of a second embodiment of the present invention taken along planes similar to planes in FIGS. 2a and 2b.
Figure 6A:
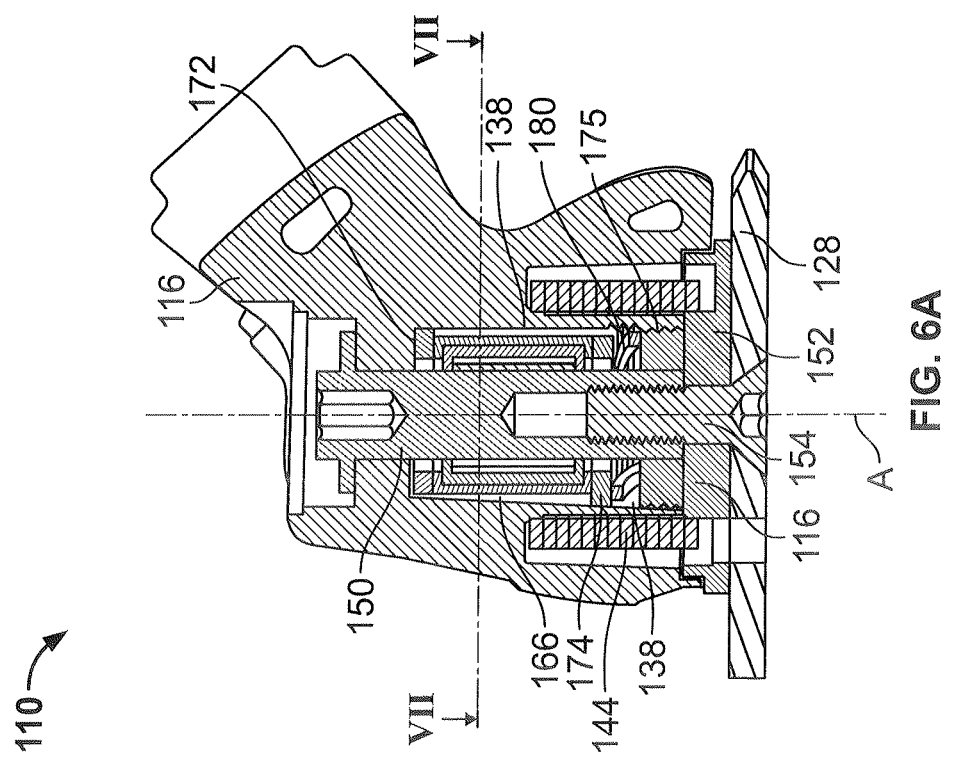
Figure 7:
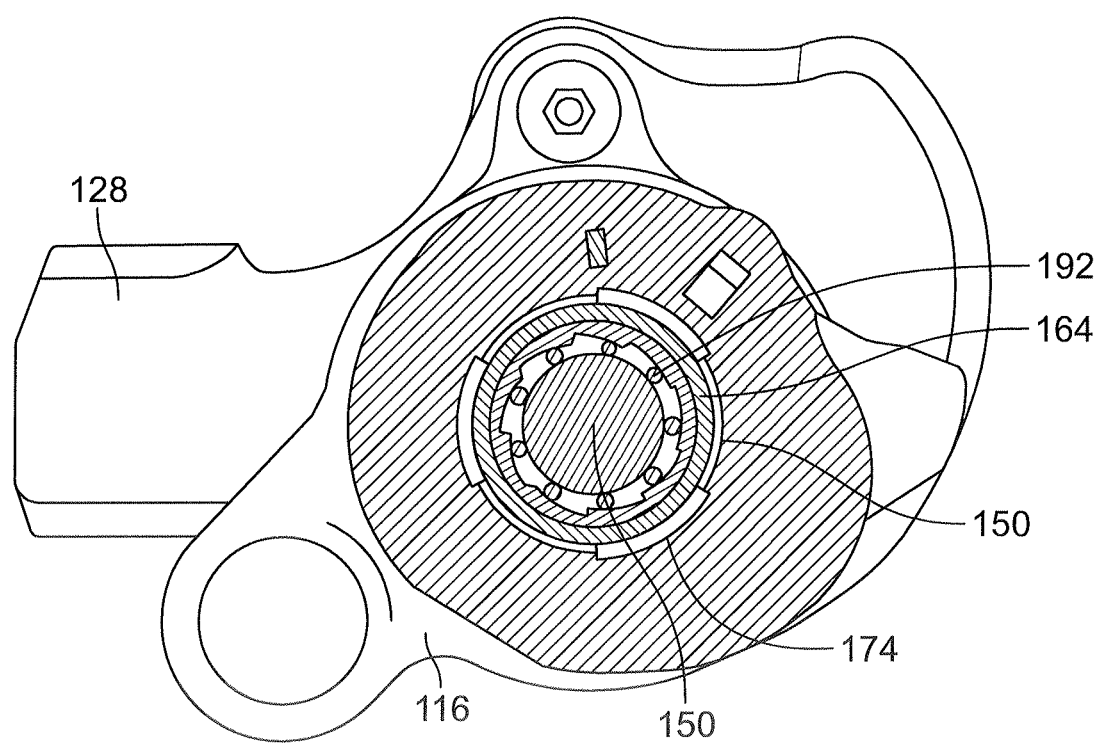
Figure 8:
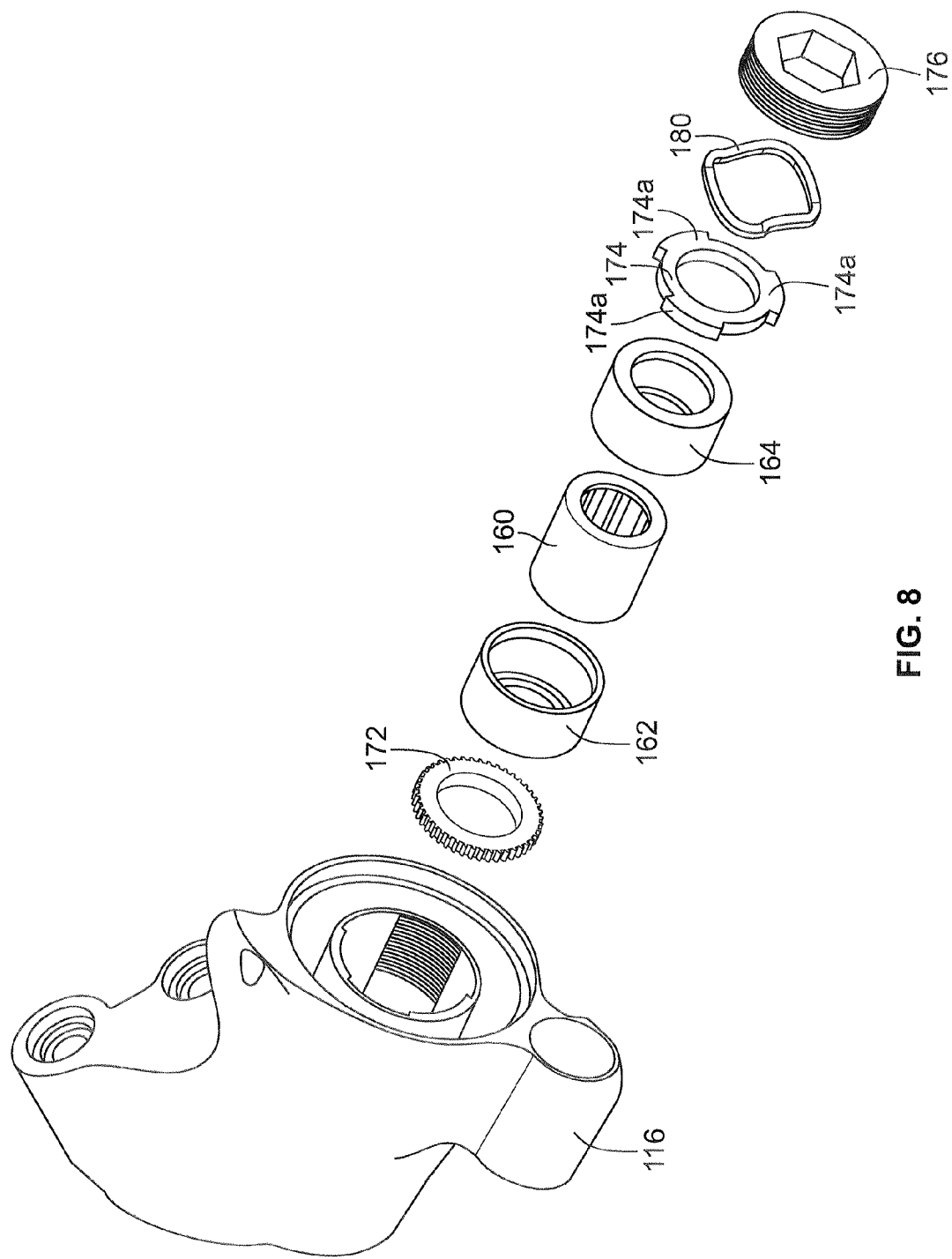
FIG. 8 is an exploded perspective view of components of the damper assembly, along with the movable member of the embodiment of FIGS. 6 and 7.
Figure 9:
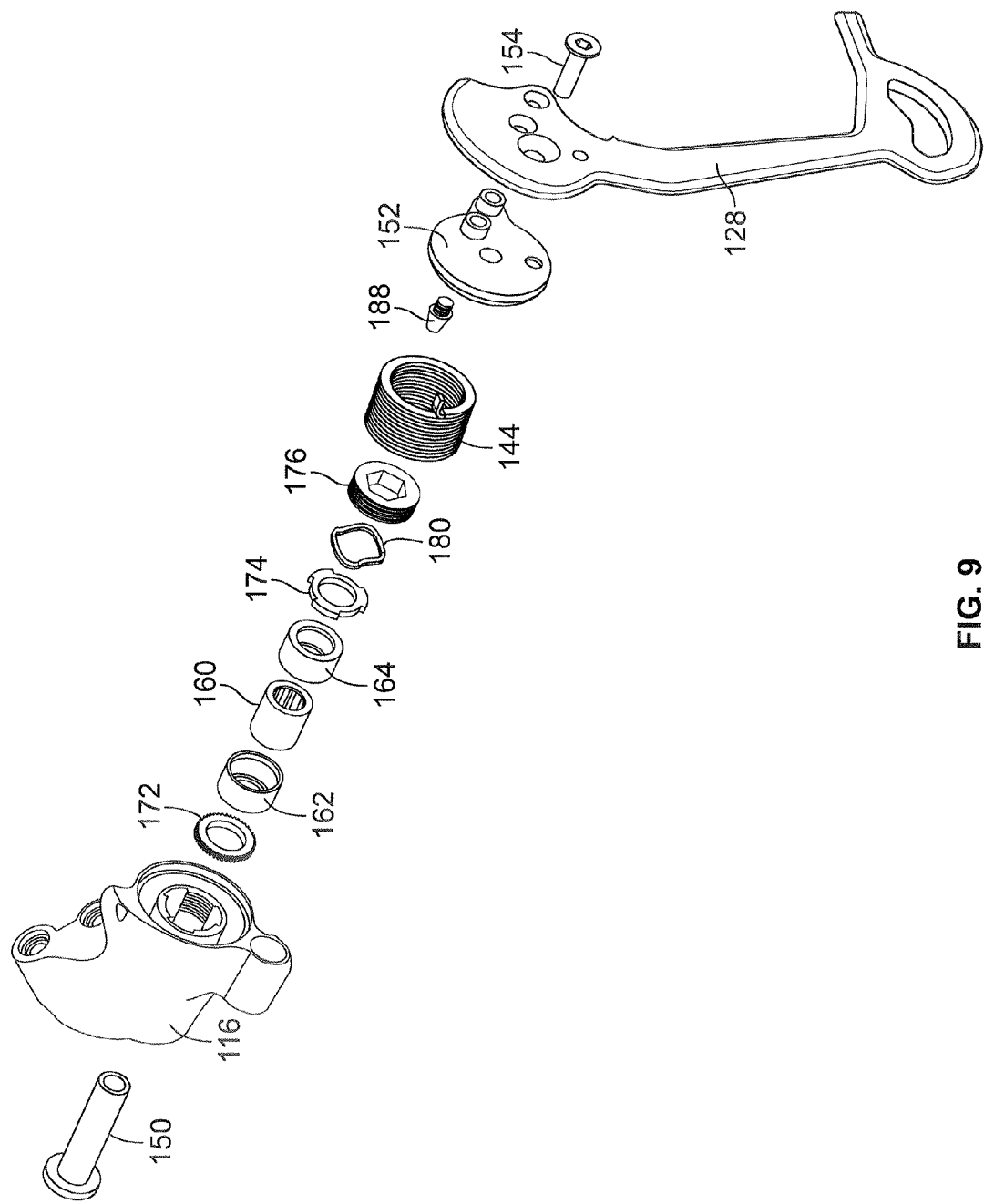
FIG. 9 is an exploded perspective view of the components according to FIG. 8, together with further components of the derailleur.
Figure 10:
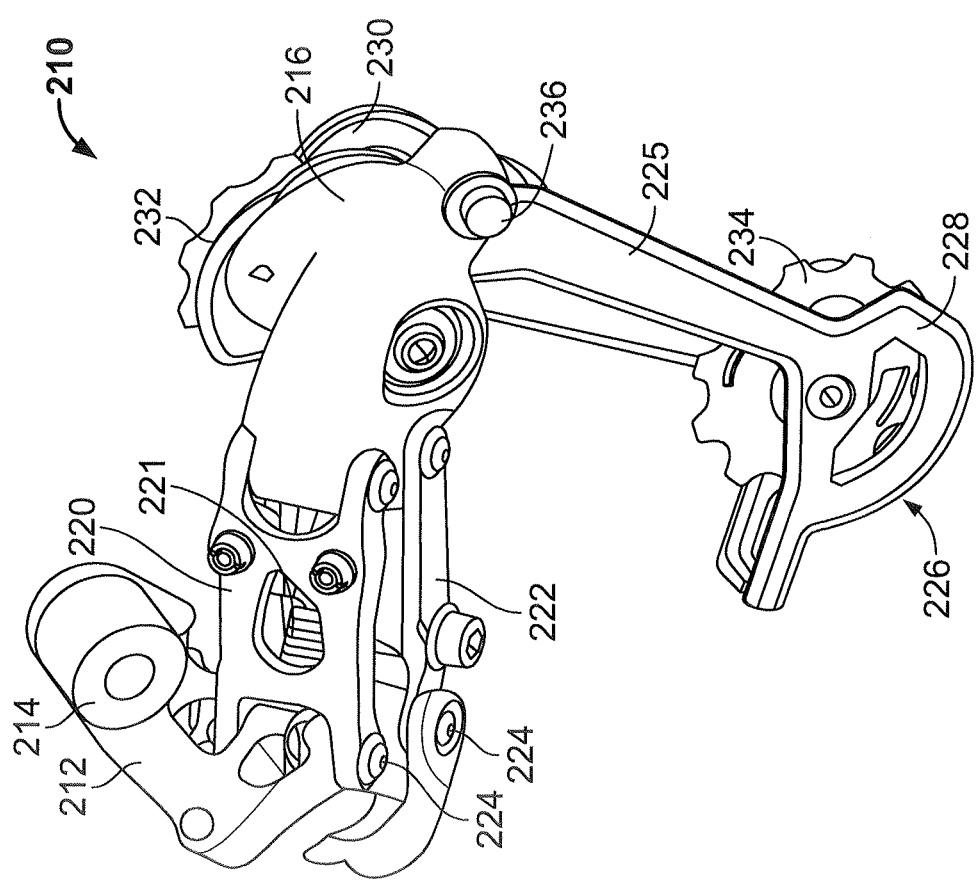
FIG. 10 is a perspective view of a third embodiment of the present invention.

Possibilities with regard to the method of assembly of the components of the second embodiment, as addressed, are evident from the structure that can be seen in FIGS. 6a and 6b, and especially from the exploded views of FIGS. 8 and 9. It is possible to introduce the rotational shaft into the cavity 166 only later, after the screw element 176 has been screwed in, from the side of the movable member opposite to the chain guide, and then to screw it onto the cage plate 128 and the intermediate washer 152 by the screw 154.

FIGS. 10-14 show a third embodiment of the present invention. Once again, only the differences as compared with the embodiments previously described will be explained, and, for the remainder, reference is explicitly made to the above description. The same reference symbols as for the first embodiment are used for identical or analogous components, increased by 200, respectively.

The third embodiment clearly differs from the first and the second embodiments. The rotational shaft 250 has a section 250a that serves for rotational mounting, with a circular (circular-cylindrical) outer circumference and a section 250b that does not have rotation symmetry, having two narrow sides 250c that form two arc segment circumference sections and two flat broad sides 250d that lie between them. The narrow sides 250c are structured on an end section adjacent to the intermediate washer 252, with outer thread sections 275, onto which the screw element 276 structured with a complementary inner thread is screwed, by means of which a friction biasing device 280, for example in the form of a corrugated spring, disposed on the opposite axial side of the roller clutch 260 enclosing the rotational shaft is axially biased, in order to bias axially directed friction surfaces of a friction device including friction washers 272 and 274 into reciprocal friction engagement.

Figure 12:
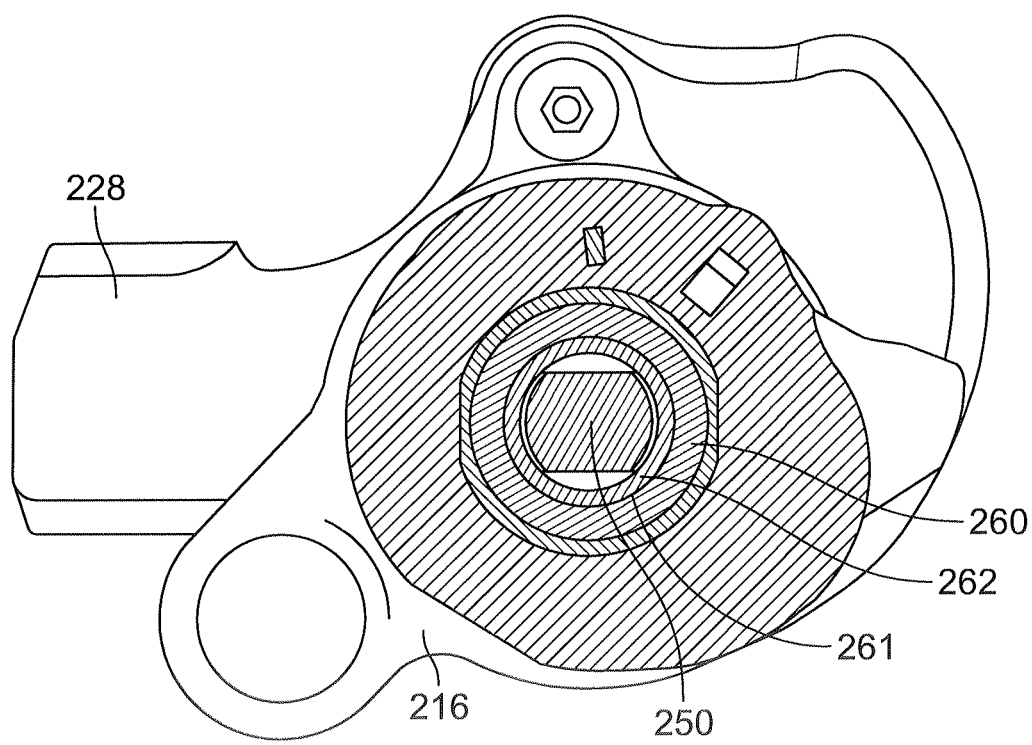
Figure 13:
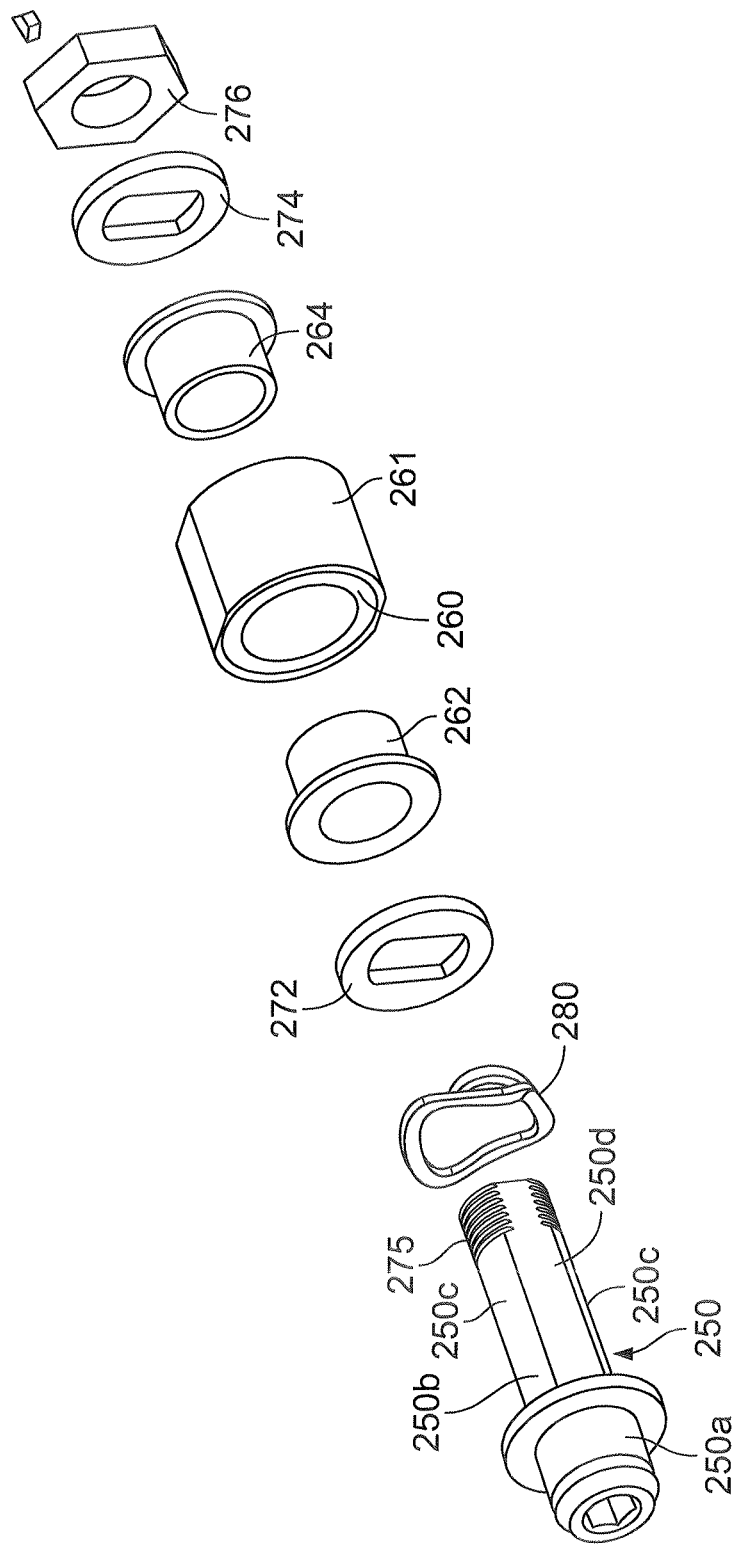
FIG. 13 is an exploded perspective view of components of the damper assembly of the embodiment of FIGS. 10 to 12.
Figure 14:
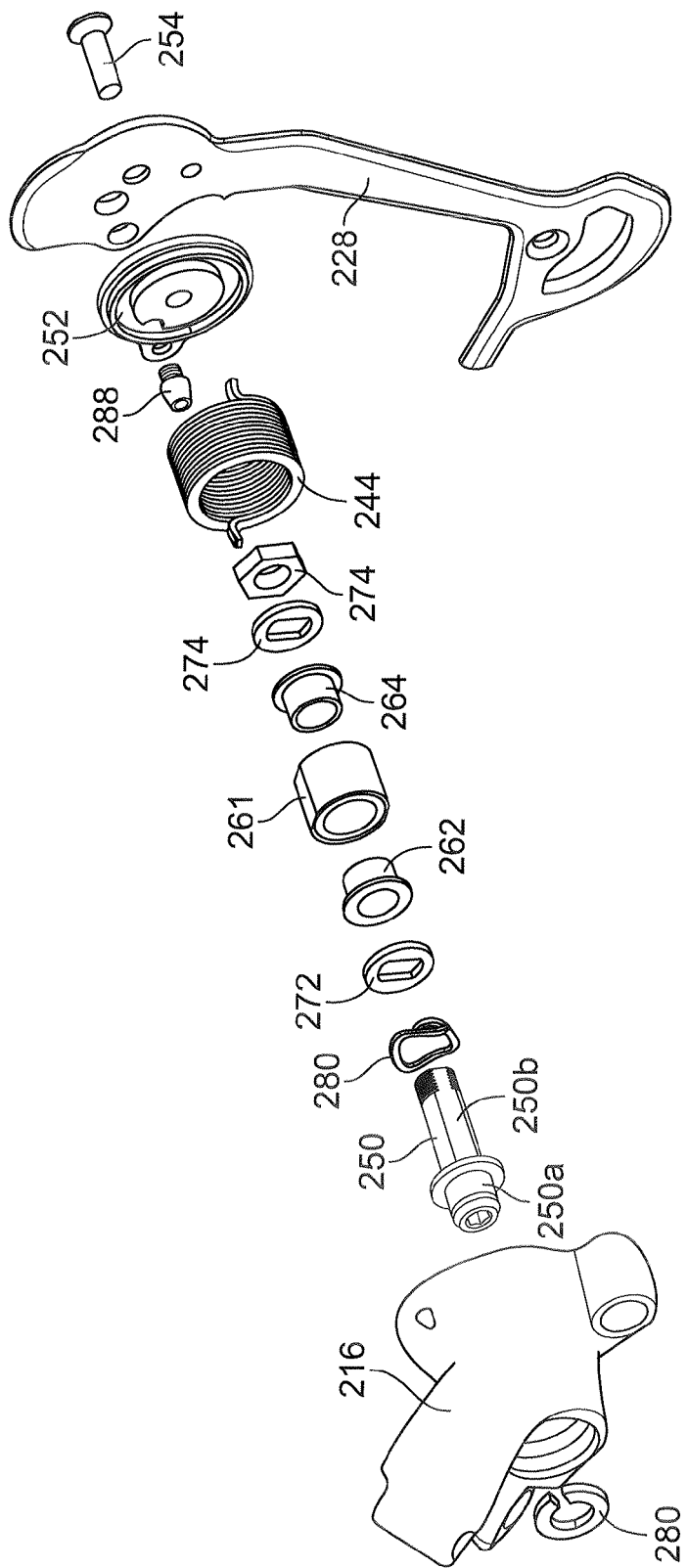
FIG. 14 is an exploded perspective view of the components of the damper assembly according to FIG. 13, together with further components of the derailleur.

It is not the rotational shaft 250 but rather a sleeve arrangement formed by two sleeves 262 and 264 that serves as the inner clutch member of the roller clutch 260; this arrangement is inserted axially into the sleeve-like outer clutch member with its roller element on the inner circumference. The outer clutch member is press fitted into in an outer supporting sleeve 261, for example, which sleeve has an outside circumference that deviates from rotation symmetry, for example with two diametrically opposite flat sides, as can be seen in FIGS. 12 and 13. The cavity 266, which once again is structured as a stepped passage bore, is structured with a complementary inner circumference that does not have rotation symmetry, so that the outer clutch member of the roller clutch 260 is supported in the cavity 166 with shape fit, to prevent rotation, by means of the supporting sleeve 261, but is displaceable in the axial direction, in order to transfer bias forces of the force storage arrangement 266 from the friction washer 272 to the friction washer 274, which is axially supported on the screw element 276, by means of the sleeves 262 and 264. The friction washers 272 and 274 each have a passage opening adapted to the outside circumference of the rotational shaft section 250b, through which the rotational shaft extends, so that the friction washers are connected for common rotation with the rotational shaft 250, but can be moved axially.

The friction surfaces of the friction washers 272 and 274, which surfaces are directed axially in a direction toward one another, are each in engagement, with friction fit, with a ring surface section on a flange-like end of the sleeves 262 and 264, where the friction engagement depends on the bias forces applied by the corrugated spring and, accordingly, on the axial position of the screw element 276 on the rotational shaft 250.

While in the first and second embodiments, the outer clutch member of the roller clutch is supported on the movable member by the friction device with friction fit, so as to prevent rotation, in the third embodiment the chain guide assembly or its rotational shaft 250 is coupled with the inner clutch member of the roller clutch 260 with friction fit, for common rotation, whereas the outer clutch member is held in the movable member 116 in torque-proof manner. The sleeves 262 and 264 correspond, in terms of their function, to the sleeves 62 and 64 or 162 and 164 of the first two embodiments, only with regard to the force transfer of the bias force between the axial friction surfaces disposed on opposite axial sides of the roller clutch. The sleeves 262 and 264, in deviation from this, also form a clutch member of the roller clutch. However, corresponding modifications are possible also for the first and second embodiments, namely that these elements 262 and 264 can form the outer clutch member, on the inner circumference of which the roller elements are disposed.

However, alternatively, it can also be provided that the sleeves 262 and 264 of the third embodiment, as addressed, serve only for axial force transfer and—by means of their flange sections—for making the friction surfaces available, and accordingly, the roller clutch 250 has an inner clutch member in sleeve form, separate from the sleeves, which element stands in engagement with the sleeve elements 262 and 264 with press fit, for example, so that the sleeves are connected with the inner clutch member in torque-proof manner. This embodiment is compatible with the representation of the one-way clutch 260 in the sectional views of the FIGS., in which no inner structure of the one-way clutch itself can be seen. Corresponding one-way clutches are easily available as supplied components, as are the free-running sleeves without their own inner clutch member, as already addressed, which must be combined with a suitable rotational shaft.

According to the third embodiment, the friction biasing device, the friction washers, and the one-way clutch having the sleeve elements as addressed are preferably mounted on the rotational shaft first, and secured by means of the screw element 272, adjusting the required friction engagement. This damper assembly, if necessary already coupled with the intermediate washer 252 and the cage plate 278 by the screw 254, is then connected with the stepped cavity 266 of the movable member 116 by pushing the rotational shaft 250 into it, and the rotational shaft is secured on the end section of the cavity opposite to the chain guide assembly by a circlip 280 or the like. For an esthetic appearance, the cavity section that is widened in the radial direction, in which the circlip 280 is accommodated, can be closed off with a lid or the like. The screw element 276 that serves as an adjusting element in the manufacture of the derailleur is disposed inaccessibly in the interior of the movable member, so that unauthorized adjustments of the factory settings are prevented However, gluing the screw element to the rotational shaft 250 is possible.

Diverse modifications of the embodiment described are possible. For example, the outer clutch member can be provided with knurling on the outside circumference, so that it can be accommodated in the cavity 266 without any need for the additional supporting sleeve, for example using press fit. However, a certain axial mobility is advantageous, so that the bias force of the friction biasing device 280 also acts on the friction surfaces that lie farther away, adjacent to the chain guide assembly.

In place of a corrugated spring arrangement as a biasing device, a washer spring arrangement or plate spring arrangement could also be provided. Additional friction surfaces can also be provided, in that a set of friction washers is provided, which are torque-proof, alternating axially, either with the rotational shaft 250 or with the movable member. In place of the screw element 276, a supporting element could stand in press-fit engagement with the end section of the rotational shaft 250. All the characteristics that bring about a deviation from rotation symmetry are of a merely exemplary nature. Diverse other embodiments are possible, which also allow rotational clutches, for example with wedge or pin structures and the like, as was already addressed with regard to the first embodiment. This holds true for all the embodiments.

Figure 17:
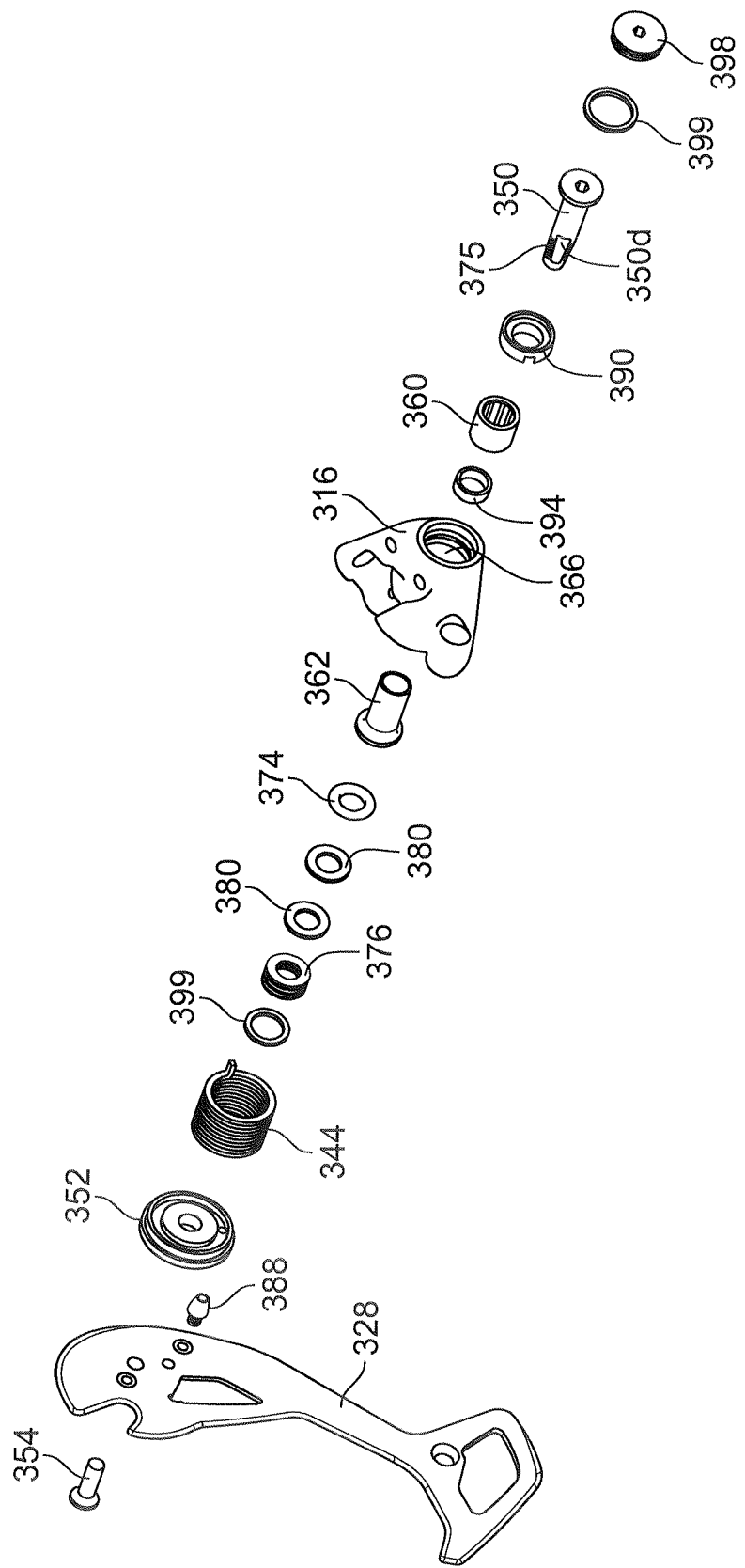
FIG. 17 is an exploded perspective view of components of the damper assembly of the embodiment of FIGS. 15 and 16, together with other components of the derailleur.

FIGS. 15 to 17 show a fourth embodiment of the present invention. Again, only the differences as compared with the embodiments described above will be explained, and for the remainder, reference is explicitly made to the preceding description. For identical or analogous components, the same reference symbols are used as for the first embodiment, increased by 300, in each instance. The fourth embodiment has commonalities with the third embodiment and also with the second embodiment.

As in the embodiment of FIGS. 6 to 9, the rotational shaft 350 of the fourth embodiment has a radially projecting flange section for axial support on the movable member 316 at its end that is at a distance from the chain guide assembly 325, and is accordingly pushed into the stepped cavity 366 of the movable member from the axial side of the movable member 316 that is at a distance from the chain guide assembly 325. This axial support can be provided a supporting element 390 separate from the movable member 316 and the rotational shaft 350, structured as a ring element, which element is accommodated in a radially slightly widened axial end region of the cavity 366 and is axially supported in a ring step of the movable member and a bearing sleeve 392 that is integrated into the movable member 316 in torque-proof and axially fixed manner. The movable member 316 can be formed around this bearing sleeve 392.

As shown in FIG. 15b and FIG. 16a, the bearing sleeve 392 has a section having a larger diameter and a hexagonal outer cross-section, at a greater distance from the chain guide assembly 325, in which section the roller clutch 360 or its radially outer clutch member is accommodated, in torque-proof manner, with press fit. This section of the bearing sleeve 392, which has the hexagonal outer cross-section, has a circular, cylindrical inner circumference as shown in the figures, but could also be structured with driver formations in the inner circumference, which engage into counter-driver formations on the outside circumference of the roller clutch or its radially outer clutch members, with shape fit.

As shown in FIG. 15a and FIG. 16b, the bearing sleeve 392 furthermore has a section having a lower diameter, axially closer to the chain guide unit 325, which section has a circular, cylindrical outside circumference and a circular, cylindrical inner circumference, and serves for rotational mounting of a sleeve element 362, with the mediation of a bearing ring 394, which element is the radially inner clutch member of the roller clutch 360 and thereby fulfills its function in the same manner as the sleeve elements 262, 264 of the third embodiment. Like these sleeve elements, the sleeve element 362 has a radially projecting ring flange at its end that is axially closer to the chain guide assembly 325, which flange makes an axially oriented friction surface available, which surface stands in friction-fit engagement with a counter-friction surface of a friction washer 374. This friction washer 374 is disposed on the rotational shaft 350 in torque-proof manner, for which reason the friction washer 374 is structured with a passage opening that does not have rotation symmetry, for example has a D-shape (cf. FIG. 17), and sits on a rotational shaft section that deviates from rotation symmetry, for example having a flattened region on one side of the rotational shaft 350. This flattened region of the rotational shaft 350 is indicated with 350d in FIG. 17, and extends axially in a section of the rotational shaft that is structured with an outside thread 375, and otherwise has an outside circumference with rotation symmetry, which is adapted to the inner circumference of the sleeve element 362 in such a manner that the rotational shaft 350, which extends through the sleeve element 362, and the sleeve element 362 can be rotated relative to one another.

The screw element 376 that is structured with an inner thread complementary to the outside thread 375 is screwed onto the latter; this element is structured with axially directed tool engagement openings 396 that are open axially in the direction toward the intermediate washer 352. The elastic force storage unit 380 is braced in between the friction washer 374 and the screw element 376 that serves as an adjusting element; in the embodiment shown, this unit is formed by two spring washers, for example plate spring washers or wave spring washers, which engage, on the one hand, on a supporting surface of the screw element 376, and, on the other hand, on a supporting surface of the friction washer 374.

Considered functionally, the fourth embodiment corresponds essentially to the third embodiment, because the rotational shaft 350 is coupled, with friction fit, with the radially inner clutch member of the roller clutch 360, which element is formed by the sleeve element 362, and the radially outer clutch member of the roller clutch is held in the movable member 316, in torque-proof manner.

For a pleasing appearance and also for protection against the effect of dirt and moisture, the end of the cavity 366 that is structured as a passage opening and lies at a distance from the chain guide assembly 325 can be closed off with a cover element 398, which can have a ring section having an outside thread, which can be screwed into a ring section of the supporting element 390, having a complementary inner thread. For this purpose, the cover element 328 can be structured with a tool engagement opening, for example for an alien wrench. For sealing, at least one O-ring 399 can furthermore act between the cover element 398, the supporting element 390, and the inner circumference of the movable member 316. At the other axial end of the cavity 366, as well, sealing can be implemented by means of at least one O-ring 399, which can be accommodated in a ring groove on the outside circumference of the screw element 376 and acts to form a seal between this screw element and the inner circumference of the movable member 316.

As in the other embodiments, the rotational shaft 350 has a screw opening at its end close to the chain guide assembly 325, which accommodates a fastening screw 354 that connects the cage plate 328 of the chain guide assembly 325 with the rotational shaft 350.

The configuration of the roller clutch 360, with a radially outer clutch member 390 that has clamping ramps on the inner circumference, the usual roller elements, and the sleeve element 362 as a radially inner clutch member, can be seen well in FIG. 16a.

The manner of assembly of the derailleur 310, relating to the components addressed, is evident from the structure and the required relative positioning of the components. During assembly, feed to the movable member 316 or into its cavity 366 takes place from axial directions in accordance with the exploded view of FIG. 17. The bearing sleeve 392 is preferably an integral part of the movable member 316.

It should be noted that the roller clutch 350, in deviation from what has been said previously, could have an inner clutch member in sleeve form, separate from the sleeve element 362, which element stands in engagement with the sleeve element 362, for example with press fit. As has already been explained, corresponding one-way couplings are easily available as supplied components, just like the free-running sleeves that have already been addressed, without their own inner clutch member, which components can be combined with the sleeve element 362 as a radially inner clutch member. With regard to further modification possibilities, what has been explained with regard to the other embodiments, specifically also with regard to the third embodiment, applies.

In all the embodiments, the roller clutch serves to ensure that the counterforce produced with friction fit, against rotation of the chain guide assembly, does not occur in the chain tensioning direction, but rather only in the pivoting direction of the chain guide assembly opposite to the chain tensioning direction. The roller clutch with the friction device and the friction biasing device therefore serves as a damper assembly, by means of which a counterforce that counteracts rotation in the direction of rotation opposite to the chain tensioning direction, relative to the movable member, can be exerted.

By means of the axially directed friction surfaces, a defined friction fit can be achieved particularly well, by means of corresponding positioning of the supporting element that supports the bias of the biasing device axially on the movable member (first and second embodiment) or on the rotational shaft (third and fourth embodiment), which element is formed by the respective screw element 76 or 176 or 276 or 376 in the embodiments. The axial friction surfaces, which are viewed as being advantageous, as such, are combined with a one-way clutch in the form of the roller clutch, without making large radial dimensions for the movable member necessary. For this purpose, the axial friction surfaces are axially offset relative to the roller elements, and disposed to radially overlap with the roller clutch. In the case of the third and fourth embodiment, the axially directed friction surfaces overlap completely with the inner clutch member, the roller element and essentially completely also with the outer clutch member.

The invention claimed is:

1. Bicycle rear derailleur comprising:
 a base member mountable to a bicycle frame;
 a movable member movably coupled to the base member;
 a chain guide assembly rotatably connected to the movable member for rotation about a rotational axis;
 a biasing device configured to bias the chain guide assembly in a first rotational direction relative to the movable member; and
 a damper assembly disposed between the chain guide assembly and the movable member to apply a damping force to the chain guide assembly when the chain guide assembly rotates in a second rotational direction opposite to the first rotational direction the damper assembly including:
  a one-way roller clutch assembly including radially inner and outer clutch members and roller elements acting between the inner and outer clutch members,
  a friction device including a friction biasing device and friction surfaces axially biased against and in frictional engagement with the one-way roller clutch assembly by the friction biasing device, the friction surfaces being axially offset with reference to the rotational axis relative to the roller elements, wherein the biasing device of the chain guide assembly is disposed radially outside the friction surfaces.

2. The bicycle rear derailleur of claim 1, wherein a radial expanse region of the roller elements overlaps with a radial expanse region of the friction surfaces, with reference to the rotational axis.

3. The bicycle rear derailleur of claim 1, wherein the friction surfaces are disposed so as to radially overlap with one of the inner clutch member and the outer clutch member, with reference to the rotational axis.

4. The bicycle rear derailleur of claim 1, wherein the chain guide assembly is connected with the movable member by a rotational shaft that is mounted in the movable member so as to rotate about the rotational axis, the rotational shaft forming the inner clutch member of the one-way roller clutch assembly.

5. The bicycle rear derailleur of claim 4, wherein the rotational shaft is mounted so as to rotate in a cavity structured in stepped manner, as a passage between opposite axial sides of the movable member, and is supported axially with respect to at least one axial direction by a supporting formation of the movable member.

6. The bicycle rear derailleur of claim 5, wherein the rotational shaft is axially supported on the movable member with respect to a first axial direction, by a supporting formation that is provided at a distance from the chain guide assembly.

7. The bicycle rear derailleur of claim 6, wherein the supporting formation is a flange section of the rotational shaft disposed on an axial end region of the rotational shaft at a distance from the chain guide assembly.

8. The bicycle rear derailleur of claim 5, wherein an element of the chain guide assembly serves as a supporting formation for axial support of the rotational shaft on the movable member with reference to an axial direction, particularly with reference to a second axial direction opposite to the first axial direction.

9. The bicycle rear derailleur of claim 8, wherein the friction surfaces are axially offset, with reference to the rotational axis, relative to at least one of the inner clutch member and the outer clutch member.

10. The bicycle rear derailleur of claim 1, wherein the friction surfaces include first friction surfaces biased against one another by the friction biasing device and second friction surfaces that are closer to the chain guide assembly than the first friction surfaces, the second friction surfaces biased against one another by the friction biasing device, the roller elements of the one-way roller clutch assembly disposed axially between the first friction surfaces and the second friction surfaces with reference to the rotational axis.

11. The bicycle rear derailleur of claim 10, wherein the biasing device includes a first biasing element and a second biasing element, wherein the roller elements of the one-way roller clutch assembly are disposed axially between the first biasing element and the second biasing element with reference to the rotational axis.

12. The bicycle rear derailleur of claim 10, wherein the biasing device is disposed proximate the first friction surfaces and acts on the second friction surfaces by a force transfer device, or that the friction biasing device is disposed in the immediate vicinity of the second friction surfaces and acts on the first friction surface by a force transfer device.

13. The bicycle rear derailleur of claim 12, wherein one of the inner clutch member and the outer clutch member forms the force transfer device.

14. The bicycle rear derailleur of claims 1, wherein the friction surfaces are disposed on one axial side of a reference plane intersecting the roller clutch and orthogonal to the rotational axis, friction surface axially offset relative to the roller elements of the roller clutch.

15. The bicycle rear derailleur of claim 14, wherein the friction surfaces are disposed on the axial side of the reference plane closer to the chain guide assembly.

16. The bicycle rear derailleur of claim 14, wherein the friction biasing device is disposed in the immediate vicinity of the friction surfaces, on the same axial side of the reference plane.

17. The bicycle rear derailleur of claims 1, wherein at least one sleeve element that encloses the roller clutch assembly radially on the outside, is coupled with the outer clutch member for common rotation.

18. Bicycle rear derailleur comprising:
a base member mountable to a bicycle frame;
a movable member movably coupled to the base member;
a chain guide assembly rotatably connected to the movable member for rotation about a rotational axis;
a biasing device configured to bias the chain guide assembly in a first rotational direction relative to the movable member; and
a damper assembly disposed between the chain guide assembly and the movable member to apply a damping force to the chain guide assembly when the chain guide assembly rotates in a second rotational direction opposite to the first rotational direction the damper assembly including:
  a one-way roller clutch assembly including radially inner and outer clutch members and roller elements acting between the inner and outer clutch members,
  a friction device including a friction biasing device and friction surfaces axially biased against and in frictional engagement with the inner clutch member of the one-way roller clutch assembly by the friction biasing device, the friction surfaces being axially offset with reference to the rotational axis relative to the roller elements.

19. Bicycle rear derailleur comprising:
a base member mountable to a bicycle frame;
a movable member movably coupled to the base member;
a chain guide assembly rotatably connected to the movable member for rotation about a rotational axis;
a biasing device configured to bias the chain guide assembly in a first rotational direction relative to the movable member; and
a damper assembly disposed between the chain guide assembly and the movable member to apply a damping force to the chain guide assembly when the chain guide assembly rotates in a second rotational direction opposite to the first rotational direction the damper assembly including:
  a one-way clutch assembly including radially inner and outer clutch members and elements acting between the inner and outer clutch members,
  a friction device including a friction biasing device and friction surfaces axially biased against and in frictional engagement with the one-way clutch assembly by the friction biasing device, wherein the biasing device of the chain guide assembly is disposed radially outside the one-way clutch assembly.

20. The bicycle rear derailleur of claim 19, wherein the biasing device of the chain guide is disposed radially outside the damper assembly.

* * * * *